United States Patent [19]

Lazarus

[11] 4,012,132

[45] Mar. 15, 1977

[54] BROADCAST MARKET SURVEY DATA STORAGE AND RETRIEVAL SYSTEM AND METHOD

[75] Inventor: Jonathan D. Lazarus, New York, N.Y.

[73] Assignee: American Broadcasting Companies, Inc., New York, N.Y.

[22] Filed: Dec. 13, 1974

[21] Appl. No.: 532,480

[52] U.S. Cl. ............................... 353/25; 353/27 A; 340/172.5
[51] Int. Cl.² ......................................... G03B 23/08
[58] Field of Search ................ 235/61.2 R; 40/102; 25/7 A; 353/25, 27; 209/80.5; 340/172.5

[56] References Cited

UNITED STATES PATENTS 3,704,451  11/1972  Pearson ........................... 340/172.5
3,799,664  3/1974   Nicholson ........................... 353/27

Primary Examiner—Eugene G. Botz
Attorney, Agent, or Firm—Curtis, Morris & Safford

[57] ABSTRACT

Television broadcast market survey data is recorded on microfiche and displayed on a microfiche reader. The data is recorded in basic data zones each of which is reserved for a single market, such as New York, Los Angeles, Detroit or one of the hundreds of other designated market areas of the U.S.A. Each data zone is of the same size regardless of the size of the market or whether the amount of data to be stored is sufficient to fill the zone. The data is divided into several parts, such as "network program averages," "program audience averages," "time period averages," "day-part summaries" etc. A separate location is reserved within each basic data zone for each type of data, and each type of data always appears at the same location in each data zone. Each fiche is assigned a code representing a broadcast market, and is selected by operating keys on the reader device. The data is recorded in pages at specific coordinates, and a page selector key array is provided for selecting a page on a given fiche for enlargement and display by the reader. The page locations are encoded according to the type of data involved and the zone in which it is to be recorded. An integral number of broadcast markets is included on each fiche. Preferably, two data zones are located on each fiche. Both relate to the same market, but are from different rating sources or organizations. The pages are encoded in sequence such that the same type of information (e.g. day-part summary) for a given market from each source can be viewed quickly and easily. The market information is modified to place it in a format suitable for use by a COM microfiche recorder to produce the fiche described above.

4 Claims, 8 Drawing Figures

E4 ARB -- NEW YORK — TIME PERIOD

| DAY AND TIME STATION PROGRAM | METRO AREA % | | DMA % (ADI) | | | | | WOMEN | | | | STATION |
|---|---|---|---|---|---|---|---|---|---|---|---|---|
| | HH | SH | HH | SH | TOT. H.H. | TOT. ADULT | TOTAL # | SH | 18-49 # | SH | 50+ | |
| MONDAY 9.30P | | | | | | | | | | | | |
| WNJU | | | | | | | | | | | | |
| TOMIKO HUT + TOTALS | 51 | 2 | 52 | 1 2 | 44 3565 | 54 4703 | 39 2592 | 2 | 20 1312 | 2 | 19 1261 | WCBS |
| 10.00P | | | | | | | | | | | | |

I2 ARB -- NEW YORK — PROGRAM AUDIENCE

| TIME STATION DAY PROGRAM | METRO AREA % | | DMA % (ADI) | | | | | WOMEN | | | | STATION |
|---|---|---|---|---|---|---|---|---|---|---|---|---|
| | HH | SH | HH | SH | TOT. H.H. | TOT. ADULT | TOTAL # | SH | 18-49 # | SH | 50+ | |
| 10.00P | | | | | | | | | | | | |
| WPIX THU 10 OCLOCK NW | 1 | 2 | 1 | 2 | 77 | 122 | 64 | 12 | 16 | 13 | 48 | |
| FRI 10 OCLOCK NW | 2 | 3 | 2 | 3 | 112 | 168 | 80 | 58 | 35 | 37 | 45 | |
| SAT 10 OCLOCK NWS | | | | | 32 | 16 | 16 | 13 | 11 | 25 | 5 | |
| AVG 10 OCLOCK NW | 1 | 3 | 1 | 3 | 99 | 144 | 72 | 12 | 32 | 17 | 40 | |
| WXTV MON SENOR VALDEZ | | | | | 12 | 22 | 14 | | 7 | | 7 | |
| TUE SENOR VALDEZ | | | | | 11 | 14 | 13 | | 8 | | 5 | |

ARB -- NEW YORK — DAY-PART

| DAY PART NETWORK STATION CHANNEL | METRO AREA % | | DMA % (ADI) | | | | | WOMEN | | | | STATION |
|---|---|---|---|---|---|---|---|---|---|---|---|---|
| | HH | SH | HH | SH | TOT. H.H. | TOT. ADULT | TOTAL # | SH | 18-49 # | SH | 50+ | |
| MON-FRI 7.00P-9.00P | | | | | | | | | | | | |
| WCBS | 1 | 15 | 1 | 14 | 80 | 57 | 35 | 12 | 15 | 13 | 20 | |
| | 3 | 35 | 3 | 34 | 188 | 252 | 164 | 58 | 93 | 37 | 121 | |
| WNEW | 3 | 33 | 3 | 32 | 189 | 60 | 37 | 13 | 29 | 25 | 8 | |
| WABC | 1 | 6 | 1 | 7 | 41 | 45 | 34 | 12 | 20 | 17 | 14 | |

FIG. 6B

AVERAGES (MONDAY) — JULY 1974 — NEXT G4

| TOTALS (000) | | MEN | | | TEENS | | CHILDREN | | WEEK COME | | | | | QTR. HR. AV. | | | |
|---|---|---|---|---|---|---|---|---|---|---|---|---|---|---|---|---|---|
| TOTAL # | SH | 18-49 # | SH | 50+ | TOT. | GIRLS | TOT. | 6-11 | METRO H.H. | STAT H.H. | M E T R O | A D | WK #1 | WK #2 | WK #3 | WK #4 | |
| 15 | 1 | 11 | 1 | 4 | 7 | 3 | 6 | 6 | | | | | | | | | |
| 212 | | 1150 | | 984 | 615 | 275 | 447 | 410 | | | | | 53 | 51 | 49 | 5 | |
| | | | | | | | | | | | | | 19 | 18 | 1 | | |

AVERAGES — JULY 1974 — NEXT K2

| TOTALS (000) | | MEN | | | TEENS | | CHILDREN | | WEEK COME | | | | | QTR. HR. AV. | | | |
|---|---|---|---|---|---|---|---|---|---|---|---|---|---|---|---|---|---|
| TOTAL # | SH | 18-49 # | SH | 50+ | TOT. | GIRLS | TOT. | 6-11 | METRO H.H. | STAT H.H. | M E T R O | A D | WK #1 | WK #2 | WK #3 | WK #4 | |
| 58 | | 11 | 14 | 47 | 14 | 1 | 7 | 7 | | | | | | | | 16 | |
| 88 | | 30 | 22 | 58 | 5 | 5 | 15 | 15 | | | | | | | | 16 | |
| 25 | | 8 | 37 | 17 | 14 | 1 | 5 | 13 | | | | | | | | 8 | |
| 72 | | 25 | 22 | 47 | 15 | | 15 | | | | | | | | | 72 | |
| 8 | 1 | | | 8 | | | | | | | | | | | | 16 | |
| | | | | | | | | | | | | | | | | 16 | |

SUMMARY — JULY 1974 — NEXT P1

| TOTALS (000) | | MEN | | | TEENS | | CHILDREN | | WEEK COME | | | | | QTR. HR. AV. | | | |
|---|---|---|---|---|---|---|---|---|---|---|---|---|---|---|---|---|---|
| TOTAL # | SH | 18-49 # | SH | 50+ | TOT. | GIRLS | TOT. | 6-11 | METRO H.H. | STAT H.H. | M E T R O | A D | WK #1 | WK #2 | WK #3 | WK #4 | |
| 22 | 14 | 7 | 14 | 15 | 4 | | 61 | 15 | 464 | | 96 | 98 | 2 | 1 | | | |
| 58 | 58 | 11 | 22 | 77 | 2 | 12 | 4 | 4 | 603 | | 78 | 97 | 2 | 1 | | | |
| 23 | 19 | 19 | 37 | 4 | 38 | 2 | 250 | 163 | 920 | | 77 | 91 | 2 | 5 | | | |
| 17 | | 17 | 22 | | 3 | | 11 | 7 | 149 | | 79 | 98 | 2 | | | 1 | |

BROADCAST MARKET SURVEY DATA STORAGE AND RETRIEVAL SYSTEM AND METHOD

This invention relates to systems and methods for storing and retrieving data, and particularly for storing and retrieving broadcast market research data for the television industry. In particular, this invention relates to the storage of such data on microfiche and the display of the data by means of a microfiche reader.

The dissemination and use of television market data has caused substantial problems for quite some time. Typically, data has been divided according to several hundred different "markets," each of which corresponds to a certain area of the United States. For example, one such market is New York, another is Chicago, a third is Los Angeles, etc. Within each market, a number of different types of data are provided. Several different survey or research organizations, such as the A. C. Nielsen Company and the Arbitron Company, provide such data for each market.

The market research data are published periodically by each survey organization in the form of books or magazines. When the user wishes to determine certain information for a given market, he or she must find the appropriate book for one of the survey organizations and look up the information. Then, if a comprehensive analysis is desired, he must find the corresponding book for the other of the organizations, and look up the same information in it also.

The book storage and retrieval method is rather slow and tedious, and requires a substantial amount of costly labor to use. Furthermore, it is subject to considerable error and ineffectiveness. For example, someone may remove a particular book from its proper place and thus make it unavailable when someone else wishes to refer to it. The usual errors committed when any information is looked up in a book compound the difficulties.

Various attempts have been made to solve the foregoing problems. One such attempt was to record the data on microfilm, and then use a microfilm reader to retrieve it. However, this did little to improve the speed and ease of use of the data, and its expense, it is believed, could not be justified. Other approaches which have been suggested are believed to be similarly unacceptable, especially as to cost.

In accordance with the foregoing, it is an object of the present invention to provide a system and method for storage and retrieval of data in which the data is stored and retrieved quickly and simply, but with a minimum of expense. It is a further object of the invention to provide such a system and method for use in storing and retrieving television market data.

In accordance with the present invention, the foregoing objects are met by the provision of a system and method for storing and retrieving data in which a plurality of photographic record members, preferably microfiche, are provided. Each record member bears, in reduced size, the data for at least one basic data category, and that data is located within a basic data zone. The basic data category preferably is a market, such as New York or Los Angeles, with the information for New York or Los Angeles being recorded on the photographic record member in the basic data zone. The information in each such category is divided into data divisions, and the information in any given data division is located at the same location within each basic data zone. Means are provided for storing the record members and selecting among them in accordance with a code identifying a selected basic data category, and means are provided for illuminating and enlarging a selected image on the record member for viewing.

Thus, in accordance with the invention, the use of the data is facilitated by locating the same type of data at the same relative location in each basic data zone so that it can be easily retrieved. Preferably, each basic data zone is of the same size, regardless of whether the information for a given market fills the zone. This makes it possible for an operator to quickly and easily locate the record member for a given market, and a given type of record within that market information so that the information can be displayed quickly and with a minimum of effort.

Preferably, each record member bears the information for an integral number of basic data categories. In the preferred form of the invention, each record member or fiche contains a market report from each of two survey companies for the same market. Alternatively, each fiche contains reports for two or more different markets from the same survey company; or it contains two or more reports from different time periods for the same market from the same survey company; or the fiche simply contains one report for one market, preferably with more data.

In the preferred embodiment of the invention, a special construction and coding arrangement is used so that different reports located on the same fiche can be viewed quickly merely by pressing a single key on the microfiche reader device.

By use of the invention, it is much easier and quicker to find and use the data than in the past. Furthermore, the fiche are stored inside the reader machine so that it is very difficult for any unauthorized person to remove the fiche. Thus, there is considerable assurance that the data will be on hand when it is needed. The beauty of the invention is that these advantages are obtained at a relatively modest cost.

The foregoing and other objects and advantages of the invention will be apparent from or described in the following description and drawings.

In the drawings:

FIG. 3 is an elevation view of a fiche recorded in accordance with the system and method of the present invention;

Figure 7:
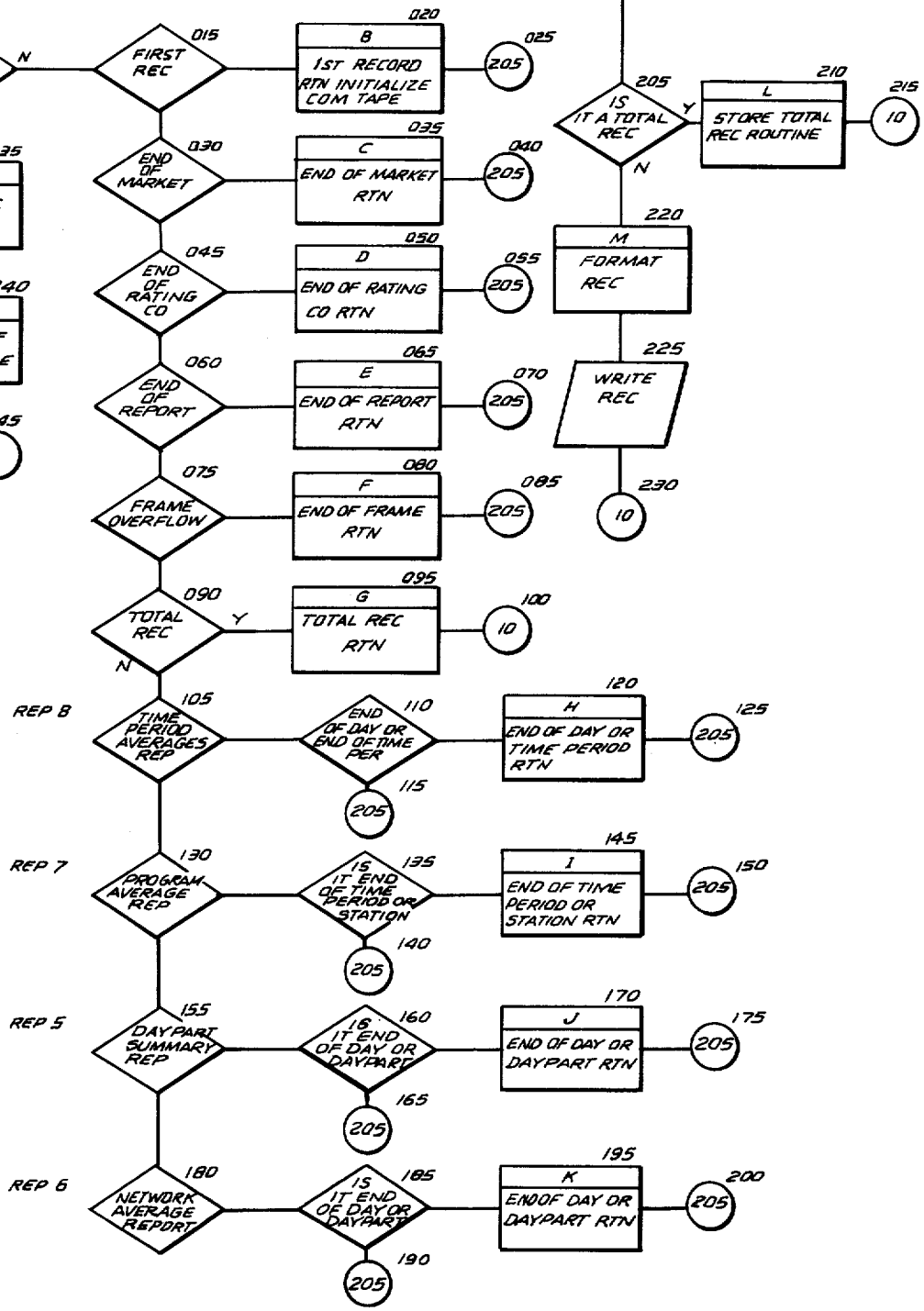

FIGS. 6A and 6B (extending over two sheets) together comprise partial reproductions of typical records displayed by the microfiche reader; and FIG. 7 is a schematic diagram of another embodiment of the invention.

Figure 1:
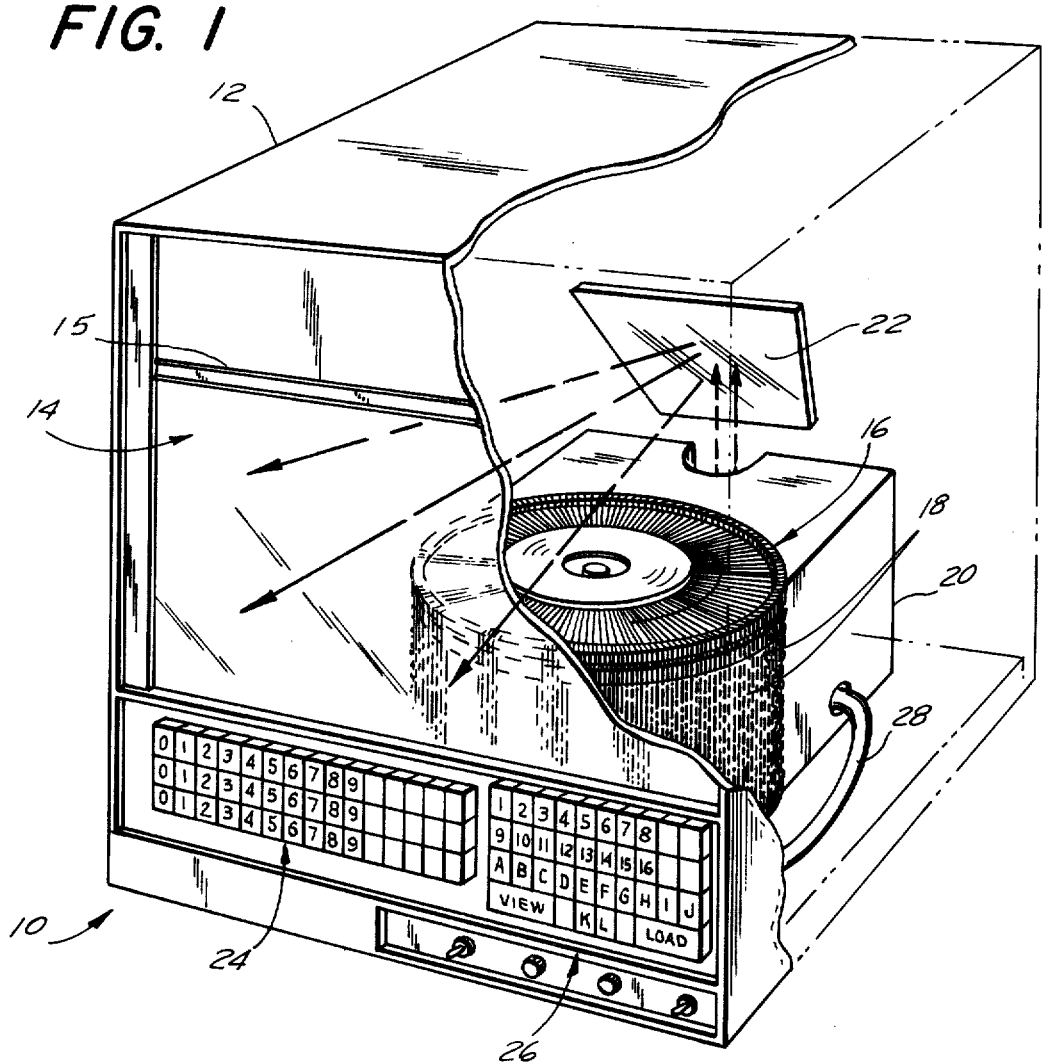
FIG. 1 is a perspective, partially broken-away view of a reader device used in the present invention.

FIG. 1 shows a microfiche reader machine 10 which includes a housing 12 and a viewing screen or window 14 upon which an enlarged microfiche image is displayed. A horizontal cursor 15 is provided. The cursor can be moved up and down on the screen 14 in order to facilitate alignment and reading of the data appearing on the screen.

Inside of the housing 12 (which is shown partially broken away), there is a rotatable "carousel" 16 in which a plurality of microfiche 18 are stored vertically. Near the carousel 16 is a unit 20 which rotates the carousel 16 until a desired fiche has been located, stops the carousel, removes the fiche from the carousel, positions the fiche so that one of its images is in a position to be projected, and then illuminates and enlarges that image. The image is reflected off of a mirror 22, and the enlarged image is projected onto the screen 14 for viewing. This mechanism is well known and will not be described in any greater detail herein. The machine 10 which actually has been used successfully in the practice of the invention is the Model 201 Microfiche Reader sold by Image Systems, Inc., Culver City, California. The structure and operation of that machine are known; they are shown and described in U.S. Pat. Nos. 3,313,055; 3,429,436; 3,555,248; 3,670,885 and 3,631,978.

The reader machine 10 includes a keyboard mounted on the front of the machine. The keyboard has a first key array 24 for selecting a fiche to be viewed, and a second key array 26 for selecting the frame or page number; that is, for selecting the specific image on the fiche which is to be projected. The key arrays 24 and 26 are connected electrically to the unit 20 by means of electrical circuitry indicated schematically by the cable 28. As it will be explained in greater detail below, the key array 26 is specially arranged and adapted for use in the present invention.

Figure 3:
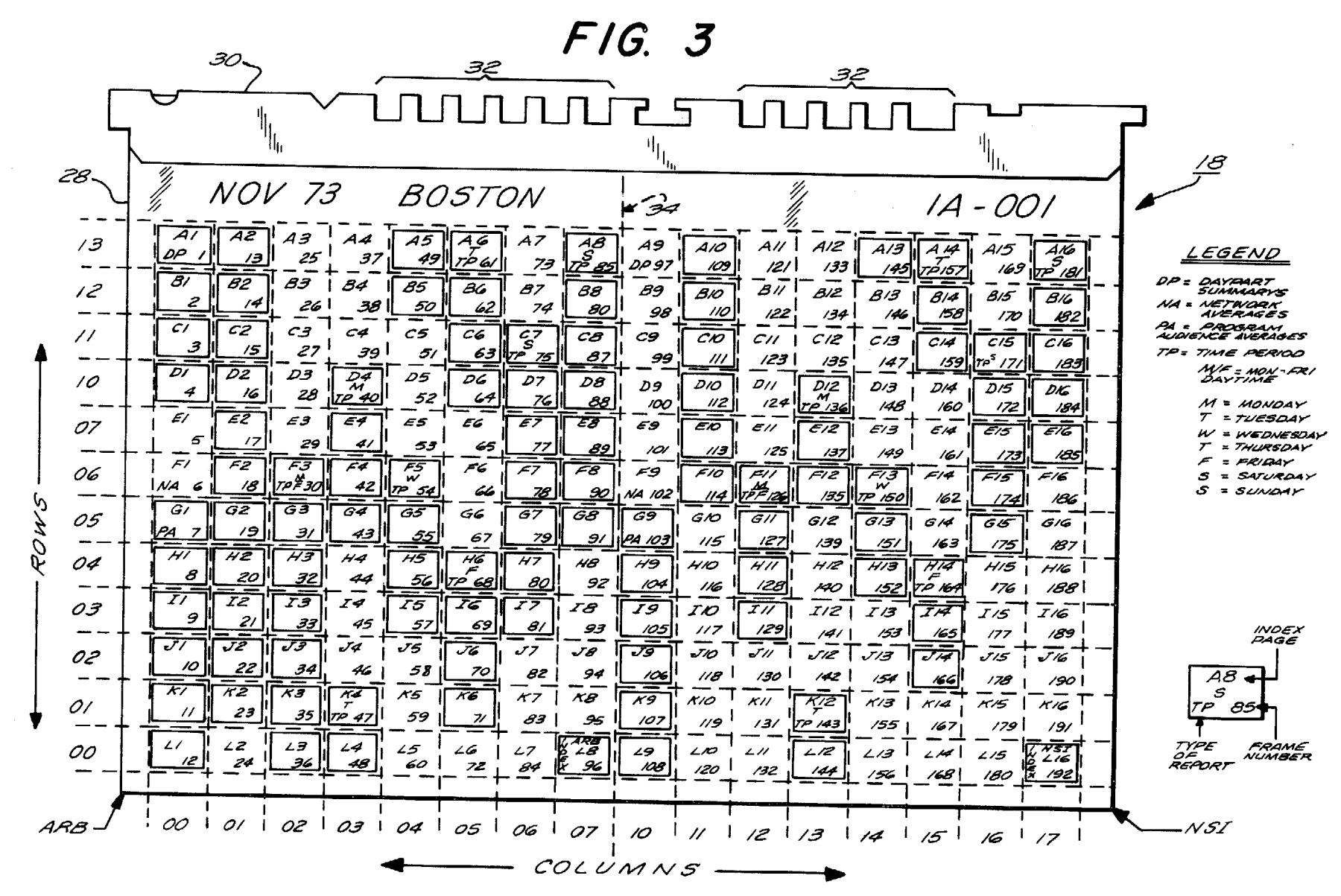

FIG. 3 is an enlarged view of a microfiche constructed in accordance with the present invention. The microfiche 18 includes a rectangular piece of photographic film 28 with a metal clip 30 which has been fastened to one edge of the film. The clip 30 has coded serrations 32 in its edge, together with other serrations used to facilitate withdrawing the fiche from and replacing the fiche in the carousel 16. As the carousel 16 rotates the coded serrations 32 on the edges of the fiche are sensed by the unit 20 shown in FIG. 1, and when the fiche bearing the desired code is detected, it is withdrawn from the carousel. The selected fiche then is positioned by an X-Y positioning device so as to provide for the projection of a specific image from a specified page or frame location on the fiche. The specific fiche shown in FIG. 3 is an example showing the actual arrangement of television market data on a fiche which has been prepared, tested and used in the present invention.

Each fiche is divided into individual areas or "frames" in which a full page of data can be recorded in greatly reduced size (e.g. reduced by 42 to 1). The frames are arranged in rows and columns. The rows are numbered, with an octal numbering system, 00 through 07 and 10 through 13. The columns also are numbered with an octal numbering system, and are numbered 00 through 07 and 10 through 17.

Each fiche is divided into two basic data zones of equal size. These zones are formed by dividing the fiche along the imaginary line 34 extending vertically through the center of the fiche. Thus, a first such zone is defined by columns 00 through 07 and the second zone is defined by columns 10 through 17. One of the zones is labeled "ARB" because it is used, in the preferred form of the invention, to store market data produced by the Arbitron Company, and the other zone is labeled "NSI" because it is used to store data for the same market from the A. C. Nielsen Company.

In accordance with one aspect of the present invention, each of the basic data zones includes the data for one market. As it can be determined by the heading of the fiche shown in FIG. 3, the fiche gives data for the Boston market as of November 1973. The market data from Arbitron is complete within the first ("ARB") zone of the fiche, and the Boston market information from NSI is complete within the second zone ("NSI") of the fiche.

As it has been noted above, the data from each market survey source is separated into several different types of information. These types of information are identified in the legend accompanying FIG. 3. In accordance with another aspect of the present invention, a given type of information always is recorded at the same starting page or frame location in the basic data zone of a fiche, regardless of which market is involved or which rating service report is being recorded. Each of the individual frames on the fiche is given both an alphanumeric and a numerical identification. For example, the first frame in column 00, row 13 is given the index page number A1, and also is given the from number 1 in the lower right hand corner. Each of the frames in row 13 has the letter A as a prefix, and a number from 1 to 16 as a suffix. Similarly, in row 12, each frame has the letter B as a prefix and one of the numbers 1 through 16 as a suffix. This coding scheme is carried forward throughout the fiche.

The starting frame for each type of information recorded on each fiche also is illustrated in FIG. 3. For example, in each basic data zone, the first five frames are reserved for day-part summaries. The frame in which this information starts is identified by the letters DP in the lower left hand corner. This is frame A1 in the first (ARB) basic data zone, and frame A9 in the second (NSI) basic data zone.

The sixth frame from the top in the first column in each data zone is reserved for the network average data, identified by the letters NA.

Twenty-three frames, starting with frame G1 or G9, are reserved for the program audience averages.

The next ten frames, starting with frame F3 or F11, are reserved for the Monday through Friday daytime time periods, identified by the letters "TP M/F". Similarly, the reports for the Monday time period (symbol M) start at frame D4 or D12; for Tuesday at K4 or K12; for Wednesday at F5 or F13; for Thursday at A6 or A14; for Friday at H6 or H14; for Saturday at C7 or C15; and for Sunday at A8 or A16.

In the lower right hand corner of frame L8 or L16 in each data zone is located an index for that zone. That index is referred to herein as a "page index". The page index can be displayed on the screen of the reader like any other page on the fiche. It tells the user which frame to select for a given segment of the data recorded in the zone. An example of such an index is given below in Table I, which shows a page index for data from the Arbitron Company for Los Angeles as of July, 1974.

TABLE I

| ARB INDEX | LOS ANGELES | JULY 1974 |
|---|---|---|
| DayPart Summarys | Mon - Fri | A 1 |
| | Mon - Fri | B 1 |
| | Mon - Fri | C 1 |
| | Sun - Sat | D 1 |
| Program Averages | 6.00A | G 1 |
| | 7.30A | H 1 |
| | 9.00A | I 1 |
| | 10.30A | J 1 |
| | 11.30A | K 1 |

TABLE I-continued

| ARB INDEX | LOS ANGELES | | JULY 1974 |
|---|---|---|---|
| | | 1.00P | L 1 |
| | | 3.00P | A 2 |
| | | 3.30P | B 2 |
| | | 4.00P | C 2 |
| | | 5.00P | D 2 |
| | | 5.00P | E 2 |
| | | 6.00P | F 2 |
| | | 6.00P | G 2 |
| | | 7.00P | H 2 |
| | | 7.30P | I 2 |
| | | 8.00P | J 2 |
| | | 8.30P | K 2 |
| | | 9.15P | L 2 |
| | | 10.00P | A 3 |
| | | 11.00P | B 3 |
| | | 11.15P | C 3 |
| | | 12.00M | D 3 |
| Time Period Average | Mon-Fri-Av | 6.00A | F 3 |
| | Mon-Fri-Av | 9.30A | G 3 |
| | Mon-Fri-Av | 12.30P | H 3 |
| | Mon-Fri-Av | 3.00P | I 3 |
| | Mon-Fri-Av | 5.00P | J 3 |
| | Mon-Fri-Av | 5.45P | K 3 |
| | Mon-Fri-Av | 6.45P | L 3 |
| | Mon-Fri-Av | 11.00P | A 4 |
| | Mon-Fri-Av | 12.15A | B 4 |
| | Monday | 4.00P | D 4 |
| | Monday | 6.00P | E 4 |
| | Monday | 8.30P | F 4 |
| | Monday | 11.00P | G 4 |
| | Monday | 12.15A | H 4 |
| | Tuesday | 4.00P | K 4 |
| | Tuesday | 6.00P | L 4 |
| | Tuesday | 8.30P | A 5 |
| | Tuesday | 11.00P | B 5 |
| | Tuesday | 12.45A | C 5 |
| | Wednesday | 4.00P | F 5 |
| | Wednesday | 6.00P | G 5 |
| | Wednesday | 8.00P | H 5 |
| Time Period Average | Wednesday | 10.30P | I 5 |
| | Wednesday | 12.15A | J 5 |
| | Thursday | 4.00P | A 6 |
| | Thursday | 6.00P | B 6 |
| | Thursday | 8.00P | C 6 |
| | Thursday | 10.30P | D 6 |
| | Thursday | 12.15A | E 6 |
| | Friday | 4.00P | H 6 |
| | Friday | 6.00P | I 6 |
| | Friday | 8.30P | J 6 |
| | Friday | 11.00P | K 6 |
| | Friday | 12.30A | L 6 |
| | Saturday | 6.00A | C 7 |
| | Saturday | 10.00A | D 7 |
| | Saturday | 1.00P | E 7 |
| | Saturday | 3.30P | F 7 |
| | Saturday | 5.30P | G 7 |
| | Saturday | 8.00P | H 7 |
| | Saturday | 10.30P | I 7 |
| | Saturday | 12.00M | J 7 |
| | Saturday | 1.30A | K 7 |
| | Sunday | 6.00A | A 8 |
| | Sunday | 10.00A | B 8 |
| | Sunday | 12.30P | C 8 |
| | Sunday | 3.00P | D 8 |
| | Sunday | 5.30P | E 8 |
| | Sunday | 8.00P | F 8 |
| | Sunday | 10.30P | G 8 |
| | Sunday | 12.15P | H 8 |

NOTE:
On index fiche, the information in Table I actually is divided into two columns.

By comparing Table I with FIG. 3, it will be apparent that reports of the same type always start at the same frame number in each basic data zone. For example, in Table I it is seen that the day part summaries start at frame A1; the program averages at G1; and the time period averages at F3, just as in the fiche shown in FIG. 3.

It also will be apparent from FIG. 3 and Table I that a substantial number of the frames in any basic data zone are left unrecorded or blank. In FIG. 3, the only frames in which data is recorded are encircled with solid lines. For example, only the first four frames of the daypart summary area is used in the ARB zone for Boston. The last frame is left blank. (It should be noted that the "network average" frame is left blank both on the Boston fiche and the Los Angeles fiche because that information was not provided for either market.)

It can be seen from the foregoing that each fiche contains an integral number of basic data zones - in the specific examples given so far, that number is two.

In order to locate the proper fiche for a given market, a master index is provided on a separate fiche. The identification number of the master index fiche always is the same. Table II below is a reproduction of a portion of such a master index.

TABLE II

MASTER INDEX

| MARKET NAME | FICHE | DATE | FICHE | DATE | FICHE | DATE |
|---|---|---|---|---|---|---|
| Elmira | 1A-520 | 05-74 | 1A-285 | 03-74 | 1A-061 | 11-73 |
| Ensign-Garden City | 1A-627 | 05-74 | 1A-392 | 03-74 | | |
| Erie | 1A-524 | 05-74 | 1A-289 | 03-74 | 1A-065 | 11-73 |
| Eugene | 1A-563 | 05-74 | 1A-328 | 03-74 | 1A-104 | 11-73 |
| Eureka | 1A-673 | 05-74 | 1A-438 | 03-74 | 1A-208 | 11-73 |
| Evansville | 1A-550 | 05-74 | 1A-315 | 03-74 | 1A-091 | 11-73 |
| Fargo | 1A-639 | 05-74 | 1A-404 | 03-74 | 1A-176 | 11-73 |
| Farmington | 1A-688 | 05-74 | 1A-453 | 03-74 | 1A-222 | 11-73 |
| Flagstaff Ariz | 1A-686 | 05-74 | 1A-451 | 03-74 | 1A-220 | 11-73 |
| Flint-Saginaw-Bay City | 1A-486 | 05-74 | 1A-251 | 03-74 | 1A-027 | 11-73 |
| Florence Ala | 1A-621 | 05-74 | 1A-386 | 03-74 | | |
| Florence SC | 1A-620 | 05-74 | 1A-385 | 03-74 | 1A-159 | 11-73 |
| Fort Dodge | 1A-641 | 05-74 | 1A-406 | 03-74 | | |

The index gives the fiche number, which always is preceded by a prefix consisting of a number followed by a letter, and then by three numbers. For example, the Elmira market code number for the May 1974 report is 1A-520. For the March 1974 report it is 1A-285 and for the November 197e report it is 1A-061. Referring again to FIG. 3, it is seen that the fiche number also is printed in the heading. Thus, for the Boston fiche shown, it is "1A-001".

READER OPERATION

The procedure for using the system described above is as follows. First the number of the desired fiche is determined. This can be done by first using the key array 24 to select the Master Index, which always has the number 000. After the number of the desired fiche is determined, that fiche is selected by means of the keys 24 and the "view" key. The keys 24 which are depressed correspond to the last three digits of the fiche number of the desired fiche. The right-hand key array 26 can be used to select one of the page indexes at frame L8 or L16 to find the desired frame number. If the "view" key is pressed and the frame selection keys have not been operated to select a frame, then frame L16 is automatically selected and displayed. Then the desired frame can be selected and viewed by operation of the keys 26. Of course, the "view" key must be pressed in order to bring the image into view. Actually, because of the consistent location of the frames on the fiche, it is rarely necessary for the operator to use the page index, because he or she remembers the location.

In accordance with another aspect of the invention, the numbered keys in the right-hand page selection array 26 are arranged so that the corresponding page from the other basic data zone on the same fiche can be brought into view with but a single key-stroke.

Referring to FIGS. 1 and 3, the first column in the ARB zone is represented by the No. 1 in the key array 26, and the first column in the NSI zone (Column 10) is represented by key No. 9 in the key array 26. Similarly, the second column in each zone is represented by key Nos. 2 and 10, respectively, and so forth. The numbered keys representing corresponding columns in each zone are located directly opposite one another on the keyboard 26. Thus, key 9 is directly below key 1; key 10 is directly below key 2; etc. Therefore, it is a simple matter to switch back and forth repidly between corresponding data from the ARB and NSI reports. All that need be done to view the other report is to depress the key immediately below or above the key pressed to view the first report. For example, if frame A1 has been selected from the ARB report, and it is desired to obtain the corresponding information from the NSI report, all that need be done is to depress key number 9 and frame A9 will pop into view. This has great advantage in the use of television market reports because it often is desired to compare data from both ARB and NSI reports for the same market.

As another example of this facility, suppose that it is desired to obtain the time period averages for Monday at 4:00 P.M. for Los Angeles market. After selecting the Los Angeles market fiche, the D key and the 4 key will be depressed to display the ARB page containing the data required. The NSI data for the same time period can be viewed simply by depressing the key immediately below the 4 key, namely the 12 key. Thus, the viewing or corresponding pages in the two data zones is greatly facilitated.

FIG. 6 is a reproduction of portions of each of the different types of report which have been referred to above. Only portions of the reports are illustrated because the remainder of the data is merely repetitive and the principle is well established by the portions which have been reproduced. Actually, each of the reports is several times greater in vertical extent when projected upon the screen of the microfiche reader 10. The headings and abbreviations identifying the data are well known in the television industry and will not be discussed in detail.

The arrangement of data on the fiche is highly advantageous, despite the fact that it would appear to be wasteful of valuable fiche space. Since an integral number of basic data zones is included on each fiche, it is not necessary to select more than one fiche in order to be able to view all of the data in a given market report. One need not change the fiche in order to look at all of the different types of data within the same market report. Moreover, the location of the same types of information at the same starting frame numbers regardless of the size of the market and the number of pages needed to record the data for that market enables users to memorize with ease the locations for the various types of data so that they can quickly locate the proper page number they wish to view. If the arrangement of data were conventional, such as where the pages are recorded sequentially in order to competely fill each fiche, the operator would have to look up the page location for each type of data for each separate fiche. This would be a timeconsuming and costly procedure.

The system has several advantages over the previous system of looking up the data in books or magazines. It is much quicker to obtain the data because the microfiche reader 10 operates rapidly to select the fiche and the page number for projection. Furthermore, separate books from different rating companies need not be consulted; the rating information from the two companies can be called up and viewed quickly and easily by the manipulation of a few key levers. Also, the fiche are locked in the cabinet 12 and cannot be removed except by authorized personnel. Thus, the information is likely to be available when needed. Moreover, all of this is accomplished at a cost which is much lower than it would be if other alternatives, such as a totally computerized video display of information, were used. In short, the system is fast, economical and reliable.

Referring again to the master index in Table II, it is to be noted that the identification number of the fiche for a given market changes from one report to the next. This is so because it is desired to leave the previous fiche in the machine, if there is room. Of course, if there is not room to do this, the old fiche can be removed and the new fiche can be given the old code numbers so that no changes in the code are necessary. Thus, if the old fiche are to be left in the carousel, a new code must be used to retrieve the latest fiche for a given market. Usually, this entails looking up the master index.

FIG. 7 illustrates a modification of the system shown in FIG. 1 which eases the latter problem and improves even further the ease and speed of operation of the system. A random access memory 25 is connected between the keyboard 24 and the fiche selector device 20, and an input device 27 is provided in order to program the memory. The memory 25 is programmed so that a single code always can be used to locate the fiche for a given market by period, regardless of the code assigned to the fiche located in the carousel 16.

Whenever new reports are filmed and placed in the carousel, the RAM 25 is changed so that the code number for a given market now identifies the location of the fiche for the market. For example, if the fiche for Boston had a market number of 001, the RAM would convert that code, when received, into a different code suitable to identify the new fiche location.

By means of the foregoing modification, the code for each market can be memorized relatively easily so that the operator need not look at the master index as frequently as he would have to otherwise.

In another alternative embodiment of the invention, instead of locating reports from different market research service companies in the two basic data zones on each fiche, both reports can be from the same company but for different markets, or for the same market, but from different report periods. Then, the reports from another service company (if they are desired) can be similarly located on different fiche, either in the same reader machine, or in a different reader machine. This can be advantageous in permitting fiche to be recorded promptly despite differences in delivery dates of the various service companies, or where the reports from only one source are desired.

Another alternative is to print more data from a given company for a given market on one fiche. In this case, only one basic data zone (still an integral number) would appear on each fiche.

FICHE RECORDING

Figure 2:
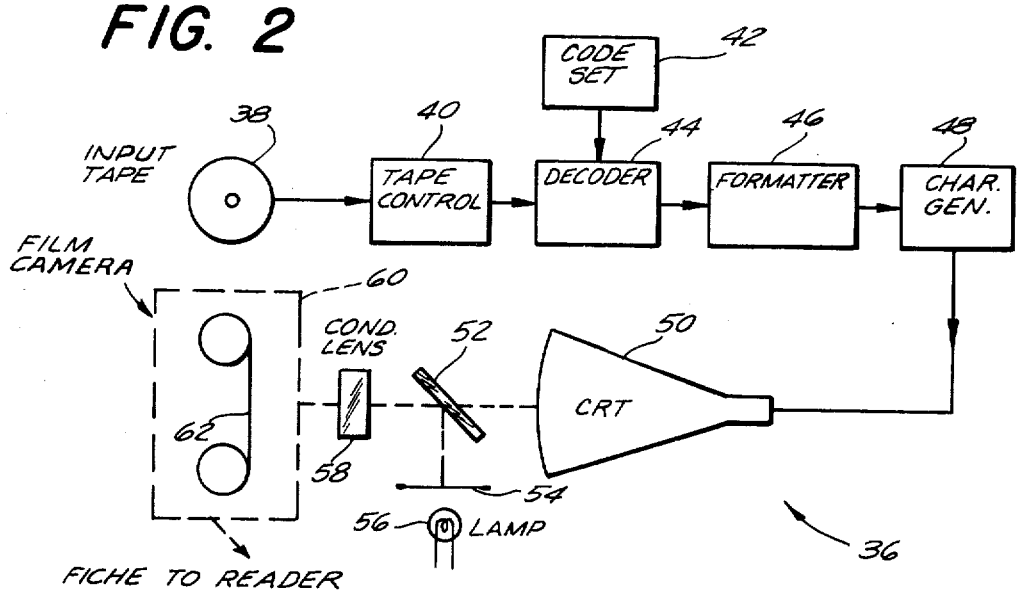
FIG. 2 is a schematic diagram of a system for recording data on fiche in accordance with the invention.

FIG. 2 shows the system 36 used for recording the fiche 18 in the form described above. The system 36 is known and in commercial use under the name "CMS 7000" which is made by Computer Micro Image Systems. Other equivalent systems are available commercially.

The data for use in recording the fiche is received on magnetic tape indicated schematically at 38 in FIG. 2. The tape is manipulated by a tape control device 40 including a tape reader, and the signals read from the tape are sent to a decoder 44 which is instructed by a code set 42 to decode the information from the tape. The decoded information is sent to a formating device 46 which converts the data into a format needed to operate the character generator 48. The character generator 48 generates signals which operate a cathode ray tube ("CRT") 50 which reproduces the characters on its screen and transmits their images through a beam splitter 52 and a condensing lens onto photographic film 62 in a film camera 60. The condensing lens greatly reduces the size of the characters. The film camera 60 includes a conventional X-Y positioning system to space and locate the characters properly on the film.

The film also receives an image of a form image overlay 54 or frame into which the data is to be recorded. the shape of this frame is such as to produce as the vertical and horizontal lines of FIG. 6 into which the data are fitted. The frame 54 is illuminated by a lamp 56, and the image of the frame is reflected off of the beam splitter 52, through the condensing lens 58, and onto the film 62. Next, the film 62 is processed and cut into individual fiche. Then the edge clip 30, appropriately coded, is attached and the fiche is ready to be used in the microfiche reader 10. The fiche is placed in the carousel 16 (FIG. 1) and is ready for withdrawal upon call.

DATA PROCESSING SYSTEM

Figure 4:
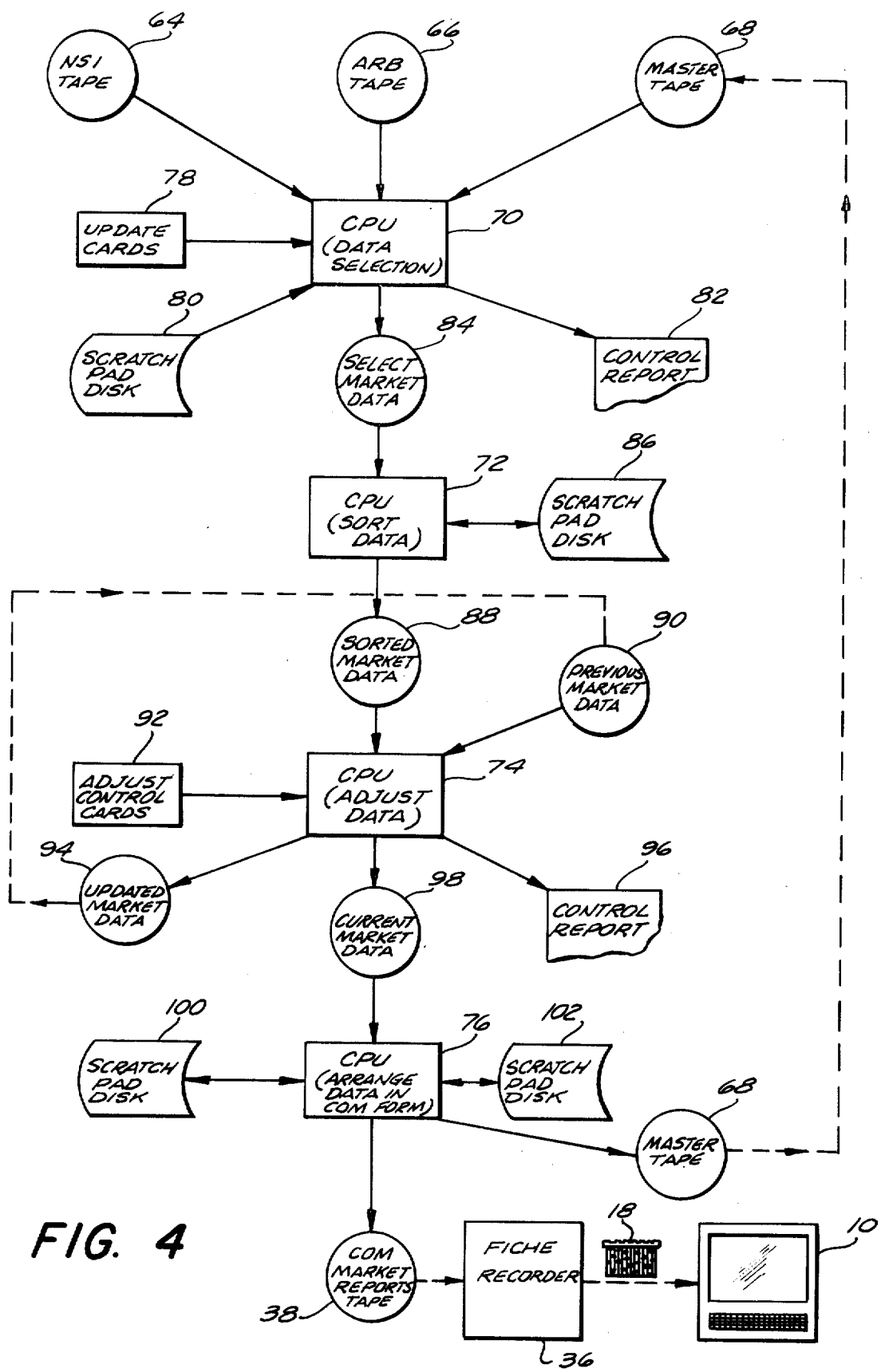
FIG. 4 is a schematic diagram illustrating the data processing phase of the present invention.

FIG. 4 is a schematic diagram of the data processing system which is used to produce the fiche 18 described above. The market data is received from the survey organization in the form of magnetic tape on reels 64 and 66. The information from these tapes then is processed in four steps to convert it into tape on the reel 38 suitable for use by the fiche recorder system 36 shown at the bottom of FIG. 4 and in FIG. 2. The first three steps of the processing are not critical to the invention and will be described only in outline form. The fourth step will be described in some detail below.

In the first processing step, data is selected from the two input tapes 64 and 66 in accordance with the customers' desires.

In the very first run of the process, there is no market master tape 68 which was previously recorded, the market master 68 is constructed from update cards 78.

A computer such as an IMB System 370-158 computer with a suitable operating system such as IBM's Operating System (OS/VS II) is used in processing the data. The computer and operating systems are referred to herein as the CPU 70, 72, 74 and 76 shown in FIG. 4. The CPU reads the data from the market master tape onto a disk file 80 which is used as a random access "scratch pad" memory to give fast access to the data. The CPU then selects data from the tapes 64 and 66 using control information from the market master file to produce the output tape 84.

Whenever a new market is added, control data for that market is added by means of a punched card reader which reads card 78 to provide the control information added to the Market Master file. Preferably, a control report 82 is provided to indicate if data is missing or erroneous. The update Market Master file 80 is also used by the CPU 76 as file 100.

The selected market data tape 84 contains the selected data, plus control information from the Market Master file 80. The tape 84 then is read into a CPU 72 which is programmed to sort the data in accordance with a conventional sort routine supplied by IBM using a scratch pad disk memory 86 during the sorting process. The sorting is done by means of a CPU from the same computer (although it is given the different reference numeral 72). If it is desired to modify the data, this can be done in the CPU at this point in the process. For example, if the time period averages are given by one rating service in a different form than for the other, the differences can be eliminated at this time. The result of this procedure is tape 88 containing the sorted market data.

In the third processing step, the adjustment run, the sorted market data from tape 88 is read into the CPU 74, which actually is the same CPU as described above. Other data previously processed 90 is also read in the CPU 74. Corrections and additional data are merged with data previously processed 74, to produce the updated market tape 94. Data for markets that have not been previously processed or have been corrected are written to tape 98.

If corrections are not necessary, the sorted market information data from tape 88 simply is re-recorded on a tape 98 to be sent to the fourth processing step. Another control report is printed out by a printer 96. The form of the data output will be disclosed in detail in the program listing for the fourth processing step described below.

In the fourth processing step, the current market data appearing on the tape reel 98 is processed to arrange the data in a form suitable for use in the microfiche recorder system shown in FIG. 2. The CPU 76 is the same as the others. Scratch pad disk 100 is prepared by the CPU 72 and contains the Market Master File. Scratch pad 102 is used as a sort program work area for the process step. Two tapes are produced as outputs; the "COM" market reports tape 38 referred to above, and the market master tape 68 which is used as an input to the next processing run.

Figure 5:
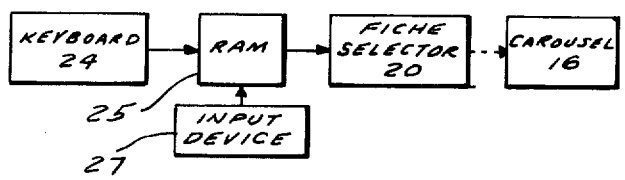
FIG. 5 is another schematic diagram illustrating the details of one of the procedures used in the data processing system shown in FIG. 4.

The procedure used in the computer program for the fourth processing step is illustrated in the schematic diagram shown in FIG. 5, and is explained in detail in the program listing which follows this discussion. The program is written in an American National Standard COBOL language. The program listing is complete, with the exception of its identification division, some data conversion tables, and other trivial information which is unimportant to an understanding of the program but nonetheless is voluminous and whose inclusion would burden the disclosure. These program details can be provided easily by one of ordinary skill in the programming art.

The program listing is divided into the usual divisions, which are identified and located in the Table of contents which precedes the program listing.

In the Data Division, the notations "ABC" throughout refer to the customer for whom the program was prepared, namely, the American Broadcasting Company. The various levels of data are indicated by the usual symbols: FD; 01; 02; 03; 77; etc.

The ABC-common-record data illustrates the form in which the data is received from the third programming step. That data also will indicate, from its form, some of the detailed processing steps used in preparing it. It will be noted that the identification of some of the data, e.g. "women 18-49," "men - total," etc. corresponds with the data headings set forth in FIG. 6.

The ABC-market-record includes the last fifteen fiche numbers and the dates on which they were prepared. Every time a new fiche is prepared, its number and date are added to this record, and the oldest fiche number and date stored in that record is deleted. This file (the Market Master File) is referred to at the start of the fourth processing step in order to get the proper number for the first fiche to be prepared. After the NSI or ARB report on a given fiche has been completed, a page index is prepared and recorded in the last frame (L8 or L16) of the fiche, and the Market Master File is updated.

The master index (see Table II above) for all market reports is produced at the end of the run and recorded on its separate fiche. The information necessary to prepare the master index is taken from the ABC market file. The records are extracted and sorted alphabetically and then read sequentially to produce the master index.

Finally, after the run is complete, the ABC market file is "backed-up to tape"; that is, the master tape 68 is prepared.

In case of a rerun, the fiche number used will be the same one used previously.

The fourth process step itself is described in the "Procedure Division" of the program listing. The procedure described there follows the process flow diagram of FIG. 5. The numbers next to the blocks in the block diagram of FIG. 5 correspond to the identification numbers to the left of the Procedure Names in the Procedure Division of the program listing. For example, number 005 indicates the "housekeeping" procedure; number 010 refers to the "read market file" procedure; number 015 refers to the "first record procedure," and number 020 refers to the "first record" routine ("routine" is abbreviated "RTN").

In FIG. 5, the diamond-shaped block labeled "EOF" indicates an end of file decision. If the end of the file has been reached then the "end of ABC file" routine 235 is performed, the new master tape is prepared in the "back-up of master file" routine 240 and the "end of job" routine 245 is initiated.

If the "end of file" condition is not detected, then the procedures indicated by the blocks 015, 030, 045, etc. is followed. In general, if the condition specified in the vertical chain is not indicated by the data read, then the next procedure below it is initiated, and so on. For example, as it is evident from the program listing of the "first record" routine 015, if the "first record" switch is not set at zero, the instruction is given to "go to 030", the "end of market" procedure. If this procedure is not indicated, the next step is to go on the "end of rating company" procedure, etc.

Referring again to FIG. 5, after the completion of each routine, such as the "first record" routine 020; "end of market" routine 035; "end of day or time period" routine 120; etc., the instruction is to go to the "process record" routine 205. Reference back to the program listing indicates that routine 205 is as follows. If the record is a total record, the "store total record" routine 210 is performed. The number 215 to the right of the encircled 10 indicates, in conventional format, that the instruction is to go to procedure 010, which is the "read market file" routine. (That is, read in the "current market data"). The number 215 is found immediately to the left of the number 010 to indicate where the process flow chart is re-entered. This nomenclature is followed throughout the diagram.

If the record is not a total record, then routine 220 is entered to format the record, and then routine 225 is performed to write the record; that is, to record the data on the output tape 38 which is being prepared for use by the COM microfiche recorder 36.

PROGRAM LISTING

TABLE OF CONTENTS

Environment Division
Data Division
  Working Storage Section
  ABC - Common-Record
  ABC - Market-Record
Procedure Division
  Sub-routines
End of Program Listing

```
ENVIRONMENT DIVISION.
CONFIGURATION SECTION.
SOURCE-COMPUTER.
    IBM-370-158.
OBJECT-COMPUTER.
    IBM-370-158.
INPUT-OUTPUT SECTION.
FILE-CONTROL.
    SELECT ABC-FILE
        ASSIGN TO UT-S-SYSABC.
    SELECT CCM-FILE
        ASSIGN TO UT-S-SYSCOM.
    SELECT MKT-RFILE
        ASSIGN TO CA-I-SYSMKTR
```

```
                    RECORD KEY IS MKT-KEY1
                    NOMINAL KEY IS MKT-NOM-KEY
                    ACCESS IS RANDOM.
            SELECT MKT-SFILE
                    ASSIGN TO DA-I-SYSMKTS
                    RECORD KEY IS MKT-KEY2
                    ACCESS IS SEQUENTIAL.
            SELECT MKT-TFILE
                    ASSIGN TO UT-S-SYSMKTT.
            SELECT MKT-TO-SORT
                    ASSIGN TO UT-S-SORTWK01.
            SELECT MKT-SORTED
                    ASSIGN TO UT-S-SYSORTED.
     I-O-CONTROL.
            APPLY CORE-INDEX ON MKT-RFILE.
     DATA DIVISION.
     FILE SECTION.
            FD   ABC-FILE
                    RECORDING MODE IS F
                    RECORD CONTAINS 264 CHARACTERS
                    BLOCK CONTAINS 49 RECORDS
                    LABEL RECORD IS STANDARD
                    DATA RECORD IS ABC-RECORD.
            01   ABC-RECORD                              PIC X(264).
            FC   CCM-FILE
                    RECORDING MODE IS F
                    RECORD CONTAINS 150 CHARACTERS
                    BLOCK CONTAINS 54 RECORDS
                    LABEL RECORD IS STANDARD
                    DATA RECORD IS COM-RECORD.
            01   COM-RECORD                              PIC X(150).
            FD   MKT-RFILE
                    RECORDING MODE IS F
                    RECORD CONTAINS 248 CHARACTERS
                    BLOCK CONTAINS 20 RECORDS
                    LABEL RECORD IS STANDARD
                    DATA RECORD IS ABC-MAR-REC.
            01   ABC-MAR-REC.
                 03     MKT-KEY1.
                        05 MKT-KEY1-REC-ID              PIC X(01).
                        05 MKT-KEY1-CODE                PIC X(04).
                 03     FILLER                          PIC X(40).
                 03     LEVEL-OF-INDEX-14               PIC X(182).
                 03     LAST-LEVEL-15                   PIC X(18).
                 03     FILLER                          PIC X(08).
            FD   MKT-SFILE
                    RECORDING MODE IS F
                    RECORD CONTAINS 248 CHARACTERS
                    BLOCK CONTAINS 20 RECORDS
                    LABEL RECORD IS STANDARD
                    DATA RECORD IS ABC-MKT-RECORD-IN.
            01   ABC-MKT-RECORD-IN.
                 03     MKT-KEY2.
                        05 MKT-KEY2-REC-ID              PIC X(01).
                        05 MKT-KEY2-CODE                PIC X(04).
                 03     FILLER                          PIC X(243).
            FD   MKT-TFILE
                    RECORDING MODE IS F
                    RECORD CONTAINS 248 CHARACTERS
                    BLOCK CONTAINS 20 RECORDS
                    LABEL RECORD IS STANDARD
                    DATA RECORD IS ABC-MKT-RECORD-OUT.
            01   ABC-MKT-RECORD-OUT                     PIC X(248).
            SD   MKT-TO-SORT
                    DATA RECORD IS RECORD-TO-SORT.
            01   RECORD-TO-SORT.
                 03 FILLER                              PIC X(05).
                 03 SORT-MKT-NAME                       PIC X(40).
                 03 FILLER                              PIC X(203).
            FD   MKT-SORTED
                    LABEL RECORDS ARE STANDARD
                    DATA RECORD IS SORTED-RECORD.
            01   SORTED-RECORD                          PIC X(248).
     WORKING-STORAGE SECTION.
            77   FILLER                                 PIC X(23)
                    VALUE '*** WORKING STORAGE ***'.
            77   FRAME-PAGE-COUNT                       PIC 9(03)   VALUE 0   CCMP.
            77   LINE-COUNT                             PIC 9(03)   VALUE 0   COMP.
            77   FPC                                    PIC 9(03)   VALUE 0   COMP.
            77   AADC                                   PIC 9(01).
            77   AADPC                                  PIC 9(02).
            77   SUBS1                                  PIC 9(03)   VALUE 0   COMP.
            77   SUBS2                                  PIC 9(03)   VALUE 0   COMP.
            77   SUBS3                                  PIC 9(03)   VALUE 0   COMP.
            77   SUBS4                                  PIC 9(03)   VALUE 0   COMP.
            77   SUBS5                                  PIC 9(03)   VALUE 0   COMP.
            77   USED-FICHE-SWITCH                      PIC 9(01)   VALUE 0   COMP.
            77   FIRST-RECORD-SWITCH                    PIC 9(01)   VALUE 0   COMP.
            77   TOTAL-REC-WRITTEN-SW                   PIC 9(01)   VALUE 0   COMP.
            77   STATION-SWITCH                         PIC 9(01)   VALUE 0   COMP.
            77   INDEX-SUBS                             PIC 9(03)   VALUE 0   COMP.
            77   BOLD-SWITCH                            PIC 9(01)   VALUE 0   COMP.
            77   INDEX-TP-DAY                           PIC X(11).
```

-continued

| | | | | | |
|---|---|---|---|---|---|
| 77 | INDEX-TP-TIME | | | PIC X(06). | |
| 77 | INDEX-PA-TIME | | | PIC X(06). | |
| 77 | INDEX-DP-DAY PIC X(13). | | | | |
| 01 | PR-DISP | | | PIC 9(05). | |
| 01 | FILLER REDEFINES PR-DISP. | | | | |
| | 03 FILLER | | | PIC X(03). | |
| | 03 RESULT-P | | | PIC 9(02). | |
| 01 | PERCENT-DIVIDEND | | | PIC 9(07) | COMP-3. |
| 01 | PERCENT-DIVIDOR | | | PIC 9(05) | COMP-3. |
| 01 | PERCENT-RESULT | | | PIC 9(05) | COMP-3. |
| 01 | ABC-COMMON-RECORD. | | | | |
| | 05 | ABC-REPORT-DATE. | | | |
| | | 10 | ABC-RPT-MONTH | PIC 99. | |
| | | 10 | ABC-RPT-YEAR | PIC 99. | |
| | 05 | ABC-MRKT-CODE | | PIC 9(4). | |
| | 05 | ABC-RATING-CCMP | | PIC X. | |
| | 05 | ABC-RPT-TYPE | | PIC 9. | |
| | 05 | ABC-SORT-SEQ | | PIC 9(7). | |
| | 05 | ABC-RECORD-TYPE | | PIC X. | |
| | 05 | ABC-RPT-CNTLS. | | | |
| | | 10 | ABC-APB-CNTLS. | | |
| | | | 15 ABC-ARP-ZONE | PIC 9. | |
| | | | 15 ABC-ARB-STAT-SEQ | PIC 99. | |
| | | | 15 ABC-ARB-DAY-CODE | PIC 9. | |
| | | | 15 ABC-ARB-QTR-HR-SEQ | PIC 99. | |
| | | | 15 ABC-ARB-DAYPART-CODE | PIC 99. | |
| | | | 15 ABC-ARB-HOME-STAT | PIC 9. | |
| | | | 15 ABC-ARB-CALL-LETR | PIC X(4). | |
| | | | 15 ABC-ARB-STAT-IND | PIC 9. | |
| | | | 15 ABC-ARP-ISALS. | | |
| | | | 20 ABC-ARB-TS-PGM1 | PIC X(14). | |
| | | | 20 ABC-ARB-TS-PGM2 | PIC X(14). | |
| | | | 20 ABC-ARB-TS-PGM3 | PIC X(14). | |
| | | | 20 ABC-ARB-TS-PGM4 | PIC X(14). | |
| | | | 20 ABC-ARB-TS-PGM | PIC X(14). | |
| | | | 20 ABC-ARB-TS-TECH | PIC 9. | |
| | | | 15 ABC-ARB-NETWORK REDEFINES ABC-ARB-TSALE. | | |
| | | | 20 ABC-ARB-NT-PGM | PIC X(40). | |
| | | | 20 ABC-ARB-NT-TECH | PIC X. | |
| | | | 20 ABC-ARB-NT-FILL | PIC X(30). | |
| | | | 15 ABC-ARB-PURE-PROGRAM REDEFINES ABC-ARB-TSALE. | | |
| | | | 20 ABC-ARB-PP-PGM | PIC X(14). | |
| | | | 20 ABC-ARB-PP-WKS | PIC 9. | |
| | | | 20 ABC-ARB-PP-TECH | PIC X. | |
| | | | 20 ABC-ARB-PP-FILL | PIC X(55). | |
| | | 10 | ABC-NSI-CNTLS REDEFINES ABC-ARB-CNTLS. | | |
| | | | 15 ABC-NSI-TP-CNTLS. | | |
| | | | 20 ABC-NSI-TP-DAY-CODE | PIC 9. | |
| | | | 20 ABC-NSI-TP-QTR-HR | PIC 99. | |
| | | | 20 ABC-NSI-TP-HR | PIC 99. | |
| | | | 20 ABC-NSI-TP-HR-QTR | PIC 9. | |
| | | | 20 ABC-NSI-TP-SEQ | PIC 99. | |
| | | | 20 ABC-NSI-TP-STAT-CALL | PIC X(4). | |
| | | | 20 ABC-NSI-TP-STAT-TYPE | PIC 9. | |
| | | | 20 ABC-NSI-TP-PGM | PIC X(16). | |
| | | | 20 ABC-NSI-TP-PROG-CODE | PIC 999. | |
| | | | 20 ABC-NSI-TP-FILL | PIC X(53). | |
| | | | 15 ABC-NSI-PP-CNTLS REDEFINES ABC-NSI-TP-CNTLS. | | |
| | | | 20 ABC-NSI-PP-QTR-HR | PIC 99. | |
| | | | 20 ABC-NSI-PP-DAY-CODE | PIC 99. | |
| | | | 20 ABC-NSI-PP-PGM | PIC X(16). | |
| | | | 20 ABC-NSI-PP-ALPHA-DAY | PIC XXX. | |
| | | | 20 ABC-NSI-PP-CALL-LETR | PIC X(4). | |
| | | | 20 ABC-NSI-PP-FILL | PIC X(58). | |
| | | | 15 ABC-NSI-DP-CNTLS REDEFINES ABC-NSI-TP-CNTLS. | | |
| | | | 20 ABC-NSI-DP-DAY-CODE | PIC 99. | |
| | | | 20 ABC-NSI-DP-ALPHA-DAY | PIC XXX. | |
| | | | 20 ABC-NSI-DP-SEQ | PIC 99. | |
| | | | 20 ABC-NSI-DP-CALL-LETR | PIC XXXX. | |
| | | | 20 ABC-NSI-DP-CHANNEL | PIC XX. | |
| | | | 20 ABC-NSI-DP-NETWORK | PIC X. | |
| | | | 20 ABC-NSI-DP-PPT-DAY | PIC X(13). | |
| | | | 20 ABC-NSI-DP-RPT-TIME | PIC X(13). | |
| | | | 20 ABC-NSI-DP-FILL | PIC X(45). | |
| | 05 | ABC-REPORT-TOTALS | | COMP-3. | |
| | | 10 | ABC-TOT-PERSONS | PIC 9(5). | |
| | | 10 | ABC-ADULTS | PIC 9(5). | |
| | | 10 | ABC-WOMAN-TOT | PIC 9(5). | |
| | | 10 | ABC-WOM-18-34 | PIC 9(5). | |
| | | 10 | ABC-WOM-18-49 | PIC 9(5). | |
| | | 10 | ABC-WOM-25-49 | PIC 9(5). | |
| | | 10 | ABC-WOM-25-64 | PIC 9(5). | |
| | | 10 | ABC-WOM-50 | PIC 9(5). | |
| | | 10 | ABC-MEN-TOT | PIC 9(5). | |
| | | 10 | ABC-MEN-18-34 | PIC 9(5). | |
| | | 10 | ABC-MEN-18-49 | PIC 9(5). | |
| | | 10 | ABC-MEN-25-49 | PIC 9(5). | |
| | | 10 | ABC-MEN-25-64 | PIC 9(5). | |
| | | 10 | ABC-MEN-50 | PIC 9(5). | |
| | | 10 | ABC-LOH-TOT | PIC 9(5). | |
| | | 10 | ABC-LOH-25-49 | PIC 9(5). | |
| | | 10 | ABC-LOH-50 | PIC 9(5). | |
| | | 10 | ABC-TEEN-TOT | PIC 9(5). | |

-continued

```
            10          ABC-TEEN-GIRLS                  PIC 9(5).
            10          ABC-CHILD-TOT                   PIC 9(5).
            10          ABC-CHILD-6-11                  PIC 9(5).
            10          ABC-HH-TOT                      PIC 9(5).
            10          ABC-METRO-RATING                PIC 9(4)V9.
            10          ABC-METRO-SHARE                 PIC 9(4)V9.
            10          ABC-DMA-RATING                  PIC 9(4)V9.
            10          ABC-DMA-SHARE                   PIC 9(4)V9.
            10          ABC-TV-HH-WK1                   PIC 9(4)V9.
            10          ABC-TV-HH-WK2                   PIC 9(4)V9.
            10          ABC-TV-HH-WK3                   PIC 9(4)V9.
            10          ABC-TV-HH-WK4                   PIC 9(4)V9.
            10          ABC-TSA-CUME-HH                 PIC 9(4)V9.
            10          ABC-DIST-HOME-ADI               PIC 9(4)V9.
            10          ABC-ADJ-AD11                    PIC 9(4)V9.
            10          ABC-ADJ-AD12                    PIC 9(4)V9.
            10          ABC-ADJ-AD13                    PIC 9(4)V9.
            10          ABC-DIST-METRO1                 PIC 9(4)V9.
            10          ABC-TP-HUT-METRO                PIC 9(4)V9.
            10          ABC-TP-HUT-DMA                  PIC 9(4)V9.
            10          ABC-TSA-CUME-STAT               PIC 9(5).
       05              ABC-NUMERIC-FILL                 PIC X(21).
       05              ABC-NETWORK-CODE                 PIC 9999.
       05              ABC-FILL                         PIC X(19).
 01  ABC-MARKET-RECORD.
       05              ABC-MKT-KEY.
            10          ABC-MKT-ID                      PIC X.
            10          ABC-MKT-CODE                    PIC X(4).
       05              ABC-MKT-NAME                     PIC X(40).
       05              ABC-MKT-INDEXES.
            10          INDEX-LEVELS OCCURS 15 TIMES.
                 15          INDX-MONTH                 PIC XX.
                 15          INDX-YEAR                  PIC XX.
                 15          INDX-FICHE                 PIC 9(5).
                 15          INDX-PG-ARB                PIC XX.
                 15          INDX-PG-NSI                PIC XX.
       05              ABC-MKT-STATION-1                PIC X(4).
       05              ABC-MKT-STATION-2                PIC X(4).
 01  WS-MARKET-INDEX.
       03              FIRST-LEVEL-INDEX                PIC X(13).
       03              LAST-14-LEVEL                    PIC X(182).
 01  MATRIX-1.
       03              FILLER       PIC X(18)    VALUE 'A 1B 1C 1D 1E 1F 1'.
       03              FILLER       PIC X(18)    VALUE 'G 1H 1I 1J 1K 1L 1'.
       03              FILLER       PIC X(18)    VALUE 'A 2B 2C 2D 2E 2F 2'.
       03              FILLER       PIC X(18)    VALUE 'G 2H 2I 2J 2K 2L 2'.
       03              FILLER       PIC X(18)    VALUE 'A 3B 3C 3D 3E 3F 3'.
       03              FILLER       PIC X(18)    VALUE 'G 3H 3I 3J 3K 3L 3'.
       03              FILLER       PIC X(18)    VALUE 'A 4B 4C 4D 4E 4F 4'.
       03              FILLER       PIC X(18)    VALUE 'G 4H 4I 4J 4K 4L 4'.
       03              FILLER       PIC X(18)    VALUE 'A 5B 5C 5D 5E 5F 5'.
       03              FILLER       PIC X(18)    VALUE 'G 5H 5I 5J 5K 5L 5'.
       03              FILLER       PIC X(18)    VALUE 'A 6B 6C 6D 6E 6F 6'.
       03              FILLER       PIC X(18)    VALUE 'G 6H 6I 6J 6K 6L 6'.
       03              FILLER       PIC X(18)    VALUE 'A 7B 7C 7D 7E 7F 7'.
       03              FILLER       PIC X(18)    VALUE 'G 7H 7I 7J 7K 7L 7'.
       03              FILLER       PIC X(18)    VALUE 'A 8B 8C 8D 8E 8F 8'.
       03              FILLER       PIC X(18)    VALUE 'G 8H 8I 8J 8K 8L 8'.
       03              FILLER       PIC X(18)    VALUE 'A 9B 9C 9D 9E 9F 9'.
       03              FILLER       PIC X(18)    VALUE 'G 9H 9I 9J 9K 9L 9'.
       03              FILLER       PIC X(18)    VALUE 'A10B10C10D10E10F10'.
       03              FILLER       PIC X(18)    VALUE 'G10H10I10J10K10L10'.
       03              FILLER       PIC X(18)    VALUE 'A11B11C11D11E11F11'.
       03              FILLER       PIC X(18)    VALUE 'A11B11C11D11E11F11'.
       03              FILLER       PIC X(18)    VALUE 'A12B12C12D12E12F12'.
       03              FILLER       PIC X(18)    VALUE 'G12H12I12J12K12L12'.
       03              FILLER       PIC X(18)    VALUE 'A13B13C13D13E13F13'.
       03              FILLER       PIC X(18)    VALUE 'G13H13I13J13K13L13'.
       03              FILLER       PIC X(18)    VALUE 'A14B14C14D14E14F14'.
       03              FILLER       PIC X(18)    VALUE 'G14H14I14J14K14L14'.
       03              FILLER       PIC X(18)    VALUE 'A15B15C15D15E15F15'.
       03              FILLER       PIC X(18)    VALUE 'G15H15I15J15K15L15'.
       03              FILLER       PIC X(18)    VALUE 'A16B16C16D16E16F16'.
       03              FILLER       PIC X(18)    VALUE 'G16H16I16J16K16L16'.
 01  MATRIX-2 REDEFINES MATRIX-1.
       03              MATRIX OCCURS 192 TIMES.
            05    MAT    PIC X(03).
 01  INDEX-LINE.
       03              INDEX-CCL OCCURS 2 TIMES.
            05    FILLER            PIC X(10).
            05    REPORT-TYPE-C1    PIC X(20).
            05    INDEX-REF-PAGE.
                 07    REF-INDEX    PIC X(27).
                 07    PAGE-INDEX   PIC X(03).
 01  INDEX-ARRAYS.
       03              INDEX-SAVE OCCURS 96 TIMES.
            05    INDEX-REF         PIC X(27).
            05    INDEX-PAGENO      PIC X(03).
 01  INDEX-TEXT-DAYPART.
       03              INDEX-DAYPART                    PIC X(13).
       03              FILLER                           PIC X(14).
 01  INDEX-TEXT-NETWORK REDEFINES INDEX-TEXT-DAYPART.
       03              INDEX-LITERAL                    PIC X(23).
```

| | | | | |
|---|---|---|---|---|
| | 03 | FILLER | PIC X(04). | |
| 01 | INDEX-TEXT-PROGRAM REDEFINES INDEX-TEXT-DAYPART. | | | |
| | 03 | INDEX-TIME | PIC X(06). | |
| | 03 | FILLER | PIC X(21). | |
| 01 | INDEX-TEXT-TIME REDEFINES INDEX-TEXT-DAYPART. | | | |
| | 03 | INDEX-DAY | PIC X(10). | |
| | 03 | FILLER | PIC X(01). | |
| | 03 | INDEX-TIME-PERIOD | PIC X(06). | |
| | 03 | FILLER | PIC X(09). | |
| 01 | INDEX-TITLE. | | | |
| | 03 | FILLER | PIC X(20) | VALUE SPACES. |
| | 03 | IT-COMPANY | PIC X(03) | VALUE SPACES. |
| | 03 | FILLER | PIC X(06) | VALUE 'INDEX'. |
| | 03 | FILLER | PIC X(21) | VALUE SPACES. |
| | 03 | IT-MARKET-NAME | PIC X(26) | VALUE SPACES. |
| | 03 | FILLER | PIC X(19) | VALUE SPACES. |
| | 03 | IT-MONTH | PIC X(09) | VALUE SPACES. |
| | 03 | FILLER | PIC X(02) | VALUE SPACES. |
| | 03 | IT-YEAR. | | |
| | | 05   IT-19 | PIC X(02) | VALUE '19'. |
| | | 05   IT-YY | PIC X(02) | VALUE SPACES. |
| | 03 | FILLER | PIC X(32) | VALUE SPACES. |
| 01 | MASTER-INDEX-TITLE. | | | |
| | 03 | FILLER | PIC X(55) | VALUE SPACES. |
| | 03 | FILLER | PIC X(15) | VALUE 'MASTER INDEX'. |
| | 03 | MI-MONTH | PIC X(09) | VALUE SPACES. |
| | 03 | FILLER | PIC X(01) | VALUE SPACES. |
| | 03 | MI-YEAR. | | |
| | | 05   MI-19 | PIC X(02) | VALUE '19'. |
| | | 05   MI-YY | PIC X(02) | VALUE SPACES. |
| | 03 | FILLER | PIC X(58) | VALUE SPACES. |
| 01 | MI-SUB-TITLE. | | | |
| | 03 | FILLER | PIC X(10) | VALUE SPACES. |
| | 03 | FILLER | PIC X(11) | VALUE 'MARKET NAME'. |
| | 03 | FILLER | PIC X(19) | VALUE SPACES. |
| | 03 | FILLER | PIC X(16) | VALUE 'FICHE DATE'. |
| | 03 | FILLER | PIC X(16) | VALUE 'FICHE DATE'. |
| | 03 | FILLER | PIC X(16) | VALUE 'FICHE DATE'. |
| | 03 | FILLER | PIC X(16) | VALUE 'FICHE DATE'. |
| | 03 | FILLER | PIC X(16) | VALUE 'FICHE DATE'. |
| | 03 | FILLER | PIC X(16) | VALUE 'FICHE DATE'. |
| | 03 | FILLER | PIC X(06) | VALUE SPACES. |
| 01 | MI-REFERENCE. | | | |
| | 03 | FILLER | PIC X(10) | VALUE SPACES. |
| | 03 | MI-MKT-NME | PIC X(26) | VALUE SPACES. |
| | 03 | FILLER | PIC X(04) | VALUE SPACES. |
| | 03 | MI-SER-NBER OCCURS 6 TIMES. | | |
| | | 05   MI-SER1 | PIC X(01). | |
| | | 05   MI-SER2 | PIC X(01). | |
| | | 05   MI-DASH | PIC X. | |
| | | 05   MI-NBER | PIC X(03). | |
| | | 05   FILLER | PIC X. | |
| | | 05   MI-DATE. | | |
| | | 07   MI-MM | PIC X(02). | |
| | | 07   MI-CASH2 | PIC X. | |
| | | 07   MI-YR | PIC X(02). | |
| | | 05   FILLER | PIC X(04). | |
| | 03 | FILLER | PIC X(06) | VALUE SPACES. |
| 01 | TITLE-FOR-ALL-REPORTS. | | | |
| | 03 | FILLER | PIC X(03) | VALUE SPACES. |
| | 03 | TR-PREV-PAGE | PIC X(03) | VALUE SPACES. |
| | 03 | FILLER | PIC X(04) | VALUE SPACES. |
| | 03 | TR-RATING-CO | PIC X(03) | VALUE SPACES. |
| | 03 | FILLER | PIC X(04) | VALUE '—'. |
| | 03 | TR-MKT-NAME | PIC X(26) | VALUE SPACES. |
| | 03 | FILLER | PIC X(17) | VALUE SPACES. |
| | 03 | TR-TITLE | PIC X(25) | VALUE SPACES. |
| | 03 | FILLER | PIC X(29) | VALUE SPACES. |
| | 03 | TR-MONTH | PIC X(09) | VALUE SPACES. |
| | 03 | FILLER | PIC X(01) | VALUE SPACES. |
| | 03 | TR-YEAR. | | |
| | | 05   TR-19 | PIC X(02) | VALUE '19'. |
| | | 05   TR-YY | PIC X(02) | VALUE SPACES. |
| | 03 | FILLER | PIC X(09) | VALUE SPACES. |
| | 03 | TR-NEXT-PAGE | PIC X(03) | VALUE SPACES. |
| | 03 | FILLER | PIC XX | VALUE SPACES. |
| 01 | SUBTITLE-FOR-ALL-REPORTS. | | | |
| | 03 | FILLER | PIC X(02) | VALUE SPACES. |
| | 03 | SUBTITLE | PIC X(17) | VALUE SPACES. |
| | 03 | FILLER | PIC X(104) | VALUE SPACES. |
| | 03 | ASTERIKS | PIC X(19) | VALUE SPACES. |
| 01 | SUBTITLE-HEADINGS. | | | |
| | 03 | DAYPART. | | |
| | | 05   FILLER | PIC X(08) | VALUE 'DAY-PART'. |
| | | 05   FILLER | PIC X(09) | VALUE SPACES. |
| | 03 | NETWORK. | | |
| | | 05   FILLER | PIC X(07) | VALUE 'NETWORK'. |
| | | 05   FILLER | PIC X(10) | VALUE SPACES. |
| | 03 | STATION. | | |
| | | 05   FILLER | PIC X(07) | VALUE 'STATION'. |
| | | 05   FILLER | PIC X(10) | VALUE SPACES. |

-continued

| | | | | | |
|---|---|---|---|---|---|
| | 03 | | CHANNEL. | | |
| | | 05 | FILLER | PIC X(07) | VALUE 'CHANNEL'. |
| | | 05 | FILLER | PIC X(10) | VALUE SPACES. |
| | 03 | | TIME-STATION. | | |
| | | 05 | FILLER | PIC X(07) | VALUE 'TIME'. |
| | | 05 | FILLER | PIC X(10) | VALUE 'STATION'. |
| | 03 | | DAY-PROGRAM. | | |
| | | 05 | FILLER | PIC X(07) | VALUE 'DAY'. |
| | | 05 | FILLER | PIC X(10) | VALUE 'PROGRAM'. |
| | 03 | | DAY-AND-TIME. | | |
| | | 05 | FILLER | PIC X(12) | VALUE 'DAY AND TIME'. |
| | | 05 | FILLER | PIC X(05) | VALUE SPACES. |
| | 03 | | STATION-PROGRAM. | | |
| | | 05 | FILLER | PIC X(17) | VALUE 'STATION PROGRAM'. |
| | 03 | | ASTERIKS1. | | |
| | | 05 | FILLER | PIC X(08) | VALUE SPACES. |
| | | 05 | FILLER | PIC X(11) | VALUE ALL '*'. |
| | 03 | | ASTERIKS2. | | |
| | | 05 | FILLER | PIC X(08) | VALUE SPACES. |
| | | 05 | FILLER | PIC X(11) | VALUE '** ** ** **'. |
| | 03 | | ASTERIKS3. | | |
| | | 05 | FILLER | PIC X(17) | VALUE SPACES. |
| | | 05 | FILLER | PIC X(02) | VALUE '**'. |
| | 04 | | ASTERIKS4. | | |
| | | 05 | FILLER | PIC X(19) | VALUE ALL ''. |
| 01 | HEADINGS-FOR-ALL-REPORTS. | | | | |
| | 03 | | FILLER | PIC X(01) | VALUE SPACES. |
| | 03 | | DP-SUBHEADING1. | | |
| | | 05 | DP-DAY-SUB | PIC X(13). | |
| | | 05 | FILLER | PIC X(06). | |
| | 03 | | DP-SUBHEADING2 REDEFINES DP-SUBHEADING1. | | |
| | | 05 | FILLER | PIC X(01). | |
| | | 05 | DP-DAYPART-SUB | PIC X(13). | |
| | | 05 | FILLER | PIC X(05). | |
| | 03 | | PA-SUBHEADING1 REDEFINES DP-SUBHEADING1. | | |
| | | 05 | PA-TIME-PERIOD-SUB | PIC X(06). | |
| | | 05 | FILLER | PIC X(13). | |
| | 03 | | TP-SUBHEADING1 REDEFINES DP-SUBHEADING1. | | |
| | | 05 | TP-DAY-SUB | PIC X(11). | |
| | | 05 | FILLER | PIC X(08). | |
| | 03 | | TP-SUBHEADING2 REDEFINES DP-SUBHEADING1 | | |
| | | 05 | FILLER | PIC X(01). | |
| | | 05 | TP-TIME-PERIOD-SUB | PIC X(06). | |
| | | 05 | FILL-DASH | PIC X(12). | |
| | 03 | | DASH-FOR-TP | PIC X(122) | VALUE SPACES. |
| 01 | DETAIL-LINE. | | | | |
| | 02 | | COM-CONTROLS. | | |
| | | 05 | COM-CC1 | PIC X(01). | |
| | | 05 | COM-CC2 | PIC X(01). | |
| | 02 | | SHIFT-IN | PIC X(04). | |
| | 02 | | TEXT-CUT. | | |
| | 03 | | DP-DETAIL-LINE. | | |
| | | 05 | FILLER | PIC X(01). | |
| | | 05 | DP-DL-NETWORK-CODE | PIC X(01). | |
| | | 05 | FILLER | PIC X(01). | |
| | | 05 | DP-DL-CALL-LETTER | PIC X(04). | |
| | | 05 | FILLER | PIC X(02). | |
| | | 05 | DP-DL-STATION | PIC X(02). | |
| | | 05 | FILLER | PIC X(15). | |
| | 03 | | NA-DETAIL-LINE REDEFINES DP-DETAIL-LINE. | | |
| | | 05 | FILLER | PIC X(07). | |
| | | 05 | NA-DL-NETWORK-CODE | PIC X(04). | |
| | | 05 | FILLER | PIC X(15). | |
| | 03 | | PA-DETAIL-LINE REDEFINES DP-DETAIL-LINE. | | |
| | | 05 | FILLER | PIC X(02). | |
| | | 05 | PA-DL-STATION | PIC X(04). | |
| | | 05 | FILLER | PIC X(01). | |
| | | 05 | PA-DL-DAY | PIC X(03). | |
| | | 05 | FILLER | PIC X(01). | |
| | | 05 | PA-DL-PROGRAM | PIC X(15). | |
| | 03 | | TP-DETAIL-LINE REDEFINES DP-DETAIL-LINE. | | |
| | | 05 | FILLER | PIC X(01). | |
| | | 05 | TP-DL-NETWORK | PIC X(01). | |
| | | 05 | FILLER | PIC X(01). | |
| | | 05 | TP-DL-STATION | PIC X(04). | |
| | | 05 | FILLER | PIC X(01). | |
| | | 05 | TP-DL-CHANNEL | PIC X(02). | |
| | | 05 | TP-DL-PROGRAM | PIC X(16). | |
| | 03 | | TOTALS-DETAIL-LINE REDEFINES DP-DETAIL-LINE. | | |
| | | 05 | FILLER | PIC X(04). | |
| | | 05 | HUTSTOTALS | PIC X(12). | |
| | | 05 | FILLER | PIC X(10). | |
| | 03 | | FIGURES-DETAIL-LINE. | | |
| | | 05 | FILLER | PIC X(01). | VALUE SPACE. |
| | | 05 | METRIC-RATING | PIC Z(03). | |
| | | 05 | MRA REDEFINES METRO-RATING | PIC X(03). | |
| | | 05 | FILLER | PIC X(01) | VALUE SPACE. |
| | | 05 | METRO-SHARE | PIC Z(02). | |

-continued

```
              05      MSA REDEFINES METRO-SHARE    PIC X(02).
              05      FILLER                       PIC X(01)      VALUE SPACE.
              05      CMA-RATING                   PIC Z(03).
              05      DMARA REDEFINES DMA-RATING   PIC X(03).
              05      FILLER                       PIC X(01)      VALUE SPACE.
              05      DMA-SHARE                    PIC Z(02).
              05      DMASA REDEFINES DMA-SHARE    PIC X(02).
              05      FILLER                       PIC X(01)      VALUE SPACE.
              05      TV-HOUSEHOLD                 PIC Z(04).
              05      FILLER                       PIC X(01)      VALUE SPACE.
              05      TOT-ADULT                    PIC Z(04).
              05      FILLER                       PIC X(01)      VALUE SPACE.
              05      TOT-WOMEN                    PIC Z(04).
              05      FILLER                       PIC X(01).     VALUE SPACE.
              05      TOT-WOMEN-SH                 PIC Z(02).
              05      FILLER                       PIC X(01).     VALUE SPACE.
              05      WOMEN-1849                   PIC Z(04).
              05      FILLER                       PIC X(01)      VALUE SPACE.
              05      WOMEN-1849SH                 PIC Z(02).
              05      FILLER                       PIC X(01)      VALUE SPACE.
              05      WOMEN-50                     PIC Z(04).
              05      FILLER                       PIC X(01)      VALUE SPACE.
              05      TOT-MEN                      PIC Z(04).
              05      FILLER                       PIC X(01)      VALUE SPACE.
              05      TOT-MEN-SH                   PIC Z(02).
              05      FILLER                       PIC X(01)      VALUE SPACE.
              05      MEN-1849                     PIC Z(04).
              05      FILLER                       PIC X(01)      VALUE SPACE.
              05      MEN-1849SH                   PIC Z(02).
              05      FILLER                       PIC X(01)      VALUE SPACE.
              05      MEN-50                       PIC Z(04).
              05      FILLER                       PIC X(01)      VALUE SPACE.
              05      TOT-TEENS                    PIC Z(04).
              05      FILLER                       PIC X(01)      VALUE SPACE.
              05      TEENS-GIRLS                  PIC Z(04).
              05      FILLER                       PIC X(01)      VALUE SPACE.
              05      TOT-CHIDREN                  PIC Z(04).
              05      FILLER                       PIC X(01)      VALUE SPACE.
              05      CHILD-611                    PIC Z(04).
              05      FILLER                       PIC X(01)      VALUE SPACE.
              05      CUME-METRO                   PIC Z(04).
              05      FILLER                       PIC X(01)      VALUE SPACE.
              05      CUME-STATION                 PIC Z(04).
              05      FILLER                       PIC X(01)      VALUE SPACE.
              05      METRO-PERCENT                PIC Z(03).
              05      FILLER                       PIC X(01)      VALUE SPACE.
              05      ADJ-PERCENT                  PIC Z(03).
              05      FILLER                       PIC X(01)      VALUE SPACE.
              05      ADJ-WEEK-1                   PIC Z(02).
              05      AW1A REDEFINES ADJ-WEEK-1    PIC X(02).
              05      FILLER                       PIC X(01)      VALUE SPACE.
              05      ADJ-WEEK-2                   PIC Z(02).
              05      AW2A REDEFINES ADJ-WEEK-2    PIC X(02).
              05      FILLER                       PIC X(01)      VALUE SPACE.
              05      ADJ-WEEK3                    PIC Z(02).
              05      AW3A REDEFINES ADJ-WEEK3     PIC X(02).
              05      FILLER                       PIC X(01)      VALUE SPACE.
              05      WEEK4                        PIC Z(02).
              05      AW4A REDEFINES WEEK4         PIC X(02).
     02       SHIFT-OUT                            PIC X(02).
01   TABLE9-ALPHA-SERIES.
     03       FILLER                               PIC X(09)      VALUE 'ABCDEFGHI'.
01   FILLER   REDEFINES TABLES-ALPHA-SERIES.
     03       ALPHA-SERIES OCCURS 9 TIMES
              INDEXED BY SERIES-CODE               PIC X(01).
01   FICHE-COUNT-NUMBER                            PIC 9(05).
01   FON      REDEFINES FICHE-COUNT-NUMBER.
     03       FICHE-SERIES.
              05      SERIE-01                     PIC 9(01).
              05      SERIE-02                     PIC 9(01).
     03       FICHE-NUMBER                         PIC 9(08).
01   USED-FICHE-COUNT-NUMBER                       PIC 9(05).
01   UFCN REDEFINES USED-FICHE-COUNT-NUMBER.
     03       UFS.
              05      USD1                         PIC 9(01).
              05      USD2                         PIC 9(01).
     03       UFN                                  PIC 9(03).
01   FICHE-LABEL-NAME.
     03       FL-DATE.
              05      FL-MONTH                     PIC X(03).
              05      FILLER                       PIC X(01)      VALUE SPACE.
              05      FL-YEAR                      PIC X(02).
     03       FILLER                               PIC X(04)      VALUE SPACES.
     03       FL-MKT-NAME                          PIC X(23).
     03       FILLER                               PIC X(04)      VALUE SPACES.
     03       FL-NUMBER.
              05      FL-SERIES.
                      07    FL-SERIES-D1           PIC X(01).
                      07    FL-SERIES-D2           PIC X(01).
              05      FILLER                       PIC X(01)      VALUE '—'.
              05      FL-NBER                      PIC 9(03).
PROCEDURE DIVISION.
005-HOUSEKEEPING.
```

```
            OPEN INPUT ABC-FILE,
                 OUTPUT OCM-FILE,
                 I-O MKT-RFILE.
006-ACCESS-LAST-FICHE.
            MOVE '10000' TO MKT-MCM-KEY.
            MOVE ' CONTROL RECORD IS MISSING' TC INV-KEY-MESSAGE.
            PERFORM 010-RED-MKT-FILE THRU 010-READ-MKT-FILE-EXIT.
            IF INV-KEY-SWITCH = 0,
                      MOVE INDX-FICHE (1) TO FICHE-COUNT-NUMBER
                      GO TO 010-READ-FILE-RTN.
            STOP RUN.
C10-READ-MKT-FILE.
            READ MKT-RFILE INTO ABC-MARKET-RECORD, INVALID KEY
                      DISPLAY MKT-NOM-KEY, INV-KEY-MESSAGE
                      MOVE 1 TO INV-KEY-SWITCH.
010-READ-MKT-FILE-EXIT.
            EXIT.
010-READ-FILE-RTN.
            READ ABC-FILE INTO ABC-COMMON-RECORD,
                      AT END GO TO 235-EOF-ABC-RTN.
            GO TO 015-FIRST-RECORD.
015-FIRST-RECORD.
            IF FIRST-RECORD-SWITCH IS NOT = 0,
                      GO TO 030-END-OF-MARKET.
            IF ABC-RECORD-TYPE = 'T',
                      GO TO 205-PROCESS-RECORD.
            GO TO 020-FIRST-RECORD-RTN.
020-FIRST-RECORD-RTN.
            MOVE 'RECORD MISSING' TO INV-KEY-MESSAGE.
            MOVE ABC-MRKT-CODE TO NOM-KEY-MARKET.
            PERFORM 010-READ-MKT-FILE THRU 010-READ-MKT-FILE-EXIT.
            IF INV-KEY-SWITCH = 1,
                      PERFORM YY-SKIP-MARKET THRU YY-SKIP-MARKET-EXIT
                      MOVE 0 TO INV-KEY-SWITCH.
            MOVE ABC-MKT-NAME TO TR-MKT-NAME
            PERFORM N-MOVE-TITLE THRU N-MOVE-TITLE-EXIT.
            IF ABC-RATNG-COMP = 'A', MOVE 'ARB' TO TR-RATING-CO
                      ELSE MOVE 'NST' TO TR-RATING-CO.
            MOVE ABC-RPT-YEAR TO TR-YY.
            SET MONTH-CODE TO ABC-RPT-MONTH.
            MOVE MONTH (MONTH-CODE) TO TR-MONTH.
            MOVE TR-MONTH TO MI-MONTH.
            MOVE TR-YY TO MI-YY.
            MOVE ABC-MKT-NAME TO FL-MKT-NAME.
            MOVE ABC-RPT-YEAR TO FL-YEAR.
            SET MONTH-3D-CODE TO ABC-RPT-MONTH.
            MOVE MONTH-3D (MONTH-3D-CODE) TO FL-MONTH.
            MOVE SPACES TO DETAIL-LINE.
            MOVE 1 TO FIRST-RECORD-SWITCH.
            PERFORM LL-INIT-INDEX THRU LL-INIT-INDEX-EXIT.
            PERFORM BB-STORE-INFORMATION THRU BB-STORE-INFORMATION-EXIT.
            PERFORM CC-NEW-FICHE THRU CC-NEW-FICHE-EXIT.
            PERFORM DD-NEW-FRAME THRU DD-NEW-FRAME-EXIT.
            PERFORM EE-TITLES THRU EE-TITLES-EXIT.
            PERFORM FF-HEADINGS THRU FF-HEADINGS-EXIT.
            PERFORM UU-SUBHEADINGS THRU UU-SUBHEADINGS-EXIT.
            PERFORM GG-UPDATE-INDEX THRU GG-UPDATE-INDEX-EXIT.
            GO TO 205-PROCESS-RECORD.
030-END-OF-MARKET.
            IF ABC-MRKT-CODE = PREV-MARKET-CODE,
                      GO TO 045-END-OF-RATING-CO.
            GO TO 035-END-OF-MARKET-RTN.
035-END-OF-MARKET-RTN.
            IF ABC-RECORD-TYPE = 'T'.
                      GO TO 005-CHECK-TOT-TO-WRIE-TOT.
            GO TO 010-CHECK-TOT-WRITE-DET.
005-CEHCK-TOT-TO-WRITE-TOT.
            IF PREV-REP-TYPE = 6 OR 7,
                      GO TO 205-PROCESS-RECORD.
            PERFORM HH-WRITE-TOTAL-REC THRU HH-WRITE-TOTAL-REC-EXIT.
            MOVE 1 TO TOTAL-REC-WRITTEN-SW.
            GO TO 205-PROCESS-RECORD.
010-CHECK-TOT-TO-WRITE-DET.
            IF TOTAL-REC-WRITTEN-SW = 1,
                      MOVE 0 TO TOTAL-REC-WRITTEN-SW
                      GO TO 036-END-OF-MARKET-RTN
            IF PREV-REP-TYPE NOT = 5 OR 8,
                      GO TO 036-END-OF-MARKET-RTN.
            PERFORM HH-WRITE-TOTAL-REC THRU HH-WRITE-TOTAL-REC-EXIT.
            GO TO 036-END-OF-MARKET-RTN.
036-END-OF-MARKET-RTN.
            PERFORM MM-PAGE-MATRIX THRU MM-PAGE-MATRIX-EXIT.
            PERFORM SS-NEXT-FRAME THRU SS-NEXT-FRAME-EXIT.
            PERFORM TT-INDEX-FRAME THRU TT-INDEX-FRAME-EXIT.
            PERFORM II-WRITE-INDEX THRU II-WRITE-INDEX-EXIT.
            PERFORM MM-PAGE-MATRIX THRU MM-PAGE-MATRIX-EXIT.
            PERFORM XX-CHECK-RERUN THRU XX-CHECK-RERUN-EXIT.
            PERFORM JJ-WRITE-LABEL THRU JJ-WRITE-LABEL-EXIT.
            IF USED-FICHE-SWITCH = 0,
                      PERFORM KK-UPDATE-MKT-FILE THRU KK-UPDATE-MKT-FILE-EXIT.
            PERFORM LL-INIT-INDEX THRU LL-INIT-INDEX-EXIT.
            PERFORM CC-NEW-FICHE THRU CC-NEW-FICHE-EXIT.
            PERFORM DD-NEW-FRAME THRU DD-NEW-FRAME-EXIT.
```

```
          MOVE ABC-MRKT-CODE TO NCM-KEY-MARKET
          PERFORM 010-READ-MKT-FILE THRU 010-READ-MKT-FILE-EXIT.
          IF INV-KEY-SWITCH = 1,
                  PERFORM YY-SKIP-MARKET THRU YY-SKIP-MARKET-EXIT
                  MOVE 0 TO INV-KEY-SWITCH.
          MOVE ABC-MKT-NAME TO FL-MKT-NAME.
          MOVE ABC-MKT-NAME TO TR-MKT-NAME
          PERFORM N-MOVE-TITLE THRU N-MOVE-TITLE-EXIT.
          IF ABC-RATING-COMP = 'A', MOVE 'ARB' TO TR-RATING-CO
                  ELSE MOVE 'NSI' TO TR-RATING-CO.
          PERFORM EE-TITLES THRU EE-TITLES-EXIT.
          PERFORM FF-HEADINGS THRU FF-HEADINGS-EXIT.
          PERFORM UU-SUBHEADINGS THRU UU-SUBHEADINGS-EXIT.
          PERFORM GG-UPDATE-INDEX THRU GG-UPDATE-INDEX-EXIT.
          GO TO 205-PROCESS-RECORD.
045-END-OF-RATING-CO.
          IF ABC-RATING-COMP = PREV-RATING-COMP
                  GO TO 060-END-OF-REPORT.
050-END-OF-RATING-CO-RTN.
          IF ABC-RECORD-TYPE = 'T',
                  GO TO 005-CHECK-TOT-TO-WRITE-TOT.
                  GO TO 010-CHECK-TOT-TO-WRITE-DET.
005-CHECK-TO-TO-WRITE-TOT.
          IF PREV-REP-TYPE = 6 OR 7,
                  GO TO 205-PROCESS-RECORD.
          PERFORM HH-WRITE-TOTAL-REC THRU HH-WRITE-TOTAL-REC-EXIT.
          MOVE 1 TO TOTAL-PEC-WRITTEN-SW.
          GO TO 205-PROCESS-RECORD.
010-CHECK-TOT-TO-WRITE-DET.
          IF TOTAL-REC-WRITTEN-SW = 1,
                  MOVE 0 TO TOTAL-REC-WRITTEN-SW
                  GO TO 051-END-OF-RATING-CO-RTN.
          IF PREV-REP-TYPE = 6 OR 7
                  GO TO 051-END-OF-RATING-CO-RTN.
          PERFORM HH-WRITE-TOTAL-REC THRU HH-WRITE-TOTAL-REC-EXIT.
          GO TO 051-END-OF-RATING-CO-RTN.
051-END-OF-RATING-CO-RTN.
          PERFORM MM-PAGE-MATRIX THRU MM-PAGE-MATRIX-EXIT.
          PERFORM SS-NEXT-FRAME THRU SS-NEXT-FRAME-EXIT.
          PERFORM TT-INDEX-FRAME THRU TT-INDEX-FRAME-EXIT.
          PERFORM II-WRITE-INDEX THRU II-WRITE-INDEX-EXIT.
          PERFORM MM-PAGE-MATRIX THRU MM-PAGE-MATRIX-EXIT.
          PERFORM LL-INIT-INDEX THRU LL-INIT-INDEX-EXIT.
          PERFORM DD-NEW-FRAME THRU DD-NEW-FRAME-EXIT.
          IF ABC-RATING-COMP = 'A', MOVE 'ARB' TO TR-RATING-CO
                  ELSE MOVE 'NSI' TO TR-RATING-CO.
          PERFORM N-MOVE-TITLE THRU N-MOVE-TITLE-EXIT.
          PERFORM EE-TITLES THRU EE-TITLES-EXIT.
          PERFORM FF-HEADINGS THRU FF-HEADINGS-EXIT.
          PERFORM UU-SUBHEADINGS THRU UU-SUBHEADINGS-EXIT.
          PERFORM GG-UPDATE-INDEX THRU GG-UPDATE-INDEX-EXIT.
          GO TO 205-PROCESS-RECORD.
060-END-OF-REPORT.
          IF ABC-RPT-TYPE = PREV-REP-TYPE
                  GO TO 075-FRAME-OVERFLOW.
          GO TO 065-END-OF-REPORT-RTN.
065-END-OF-REPORT-RTN.
          IF ABC-RECORD-TYPE = 'T',
                  GO TO E05-CHECK-TOT-TO-WRITE-TOT.
          GO TO E10-CHECK-TOT-TO-WRITE-DET.
E05-CHECK-TOT-TO-WRITE-TOT.
          IF PREV-REP-TYPE = 6 OT 7,
                  GO TO 205-PROCESS-RECORD.
          PERFORM HH-WRITE-TOTAL-REC THRU HH-WRITE-TOTAL-REC-EXIT.
          MOVE 1 TO TOTAL-REC-WRITTEN-SW.
          GO TO 205-PROCESS-RECORD.
E10-CHECK-TOT-TO-WRITE-DET.
          IF TOTAL-REC-WRITTEN-SW = 1,
                  MOVE 0 TO TOTAL-REC-WRITTEN-SW
                  GO TO 066-END-OF-REPORT-RTN.
          IF PREV-REP-TYPE = 6 OR 7,
                  GO TO 066-END-OF-REPORT-RTN.
          PERFORM HH-WRITE-TOTAL-REC THRU HH-WRITE-TOTAL-REC-EXIT.
          GO TO 066-END-OF-REPORT-RTN.
066-END-OF-REPORT-RTN.
          PERFORM MM-PAGE-MATRIX THRU MM-PAGE-MATRIX-EXIT.
          PERFORM SS-NEXT-FRAME THRU SS-NEXT-FRAME-EXIT.
          PERFORM DD-NEW-FRAME THRU DD-NEW-FRAME-EXIT.
          PERFORM N-MOVE-TITLE THRU N-MOVE-TITLE-EXIT.
          PERFORM EE-TITLES THRU EE-TITLES-EXIT.
          PERFORM FF-HEADINGS THRU FF-HEADINGS-EXIT.
          PERFORM UU-SUBHEADINGS THRU UU-SUBHEADINGS EXIT.
          PERFORM GG-UPDATE-INDEX THRU GG-UPDATE-INDEX-EXIT.
          GO TO 205-PROCESS-RECORD.
075-FRAME-OVERFLOW.
          IF LINE-COUNT < 81,
                  GO TO 090-TOTAL-REC.
          GO TO 080-END-OF-FRAME-RTN.
080-END-OF-FRAME-RTN.
          IF ABC-RECORD-TYPE = 'T',
                  PERFORM HH-WRITE-TOTAL-REC THRU HH-WRITE-TOTAL-REC-EXIT
                  GO TO 205-PROCESS-RECORD.
          PERFORM MM-PAGE-MATRIX THRU MM-PAGE-MATRIX-EXIT.
```

```
-continued
        PERFORM SS-NEXT-FRAME THRU SS-NEXT-FRAME-EXIT.
        IF ABC-RPT-TYPE NOT = 8,
                GO TO 085-END-OF-FRAME-RTN.
        IF ABC-RATING-COMP = 'A',
                GO TO 081-CHECK-OVERFLOW-SKIP-TP-ARB.
        GO TO 081-CHECK-OVERFLOW-SKIP-TP-NSI.
081-CHECK-OVERFLOW-SKIP-TP-ARB.
        IF ABC-ARB-DAY-CODE = PREV-TP-DAY-CODE
                GO TO 085-END-OF-FRAME-RTN.
        PERFORM DD-NEW-FRAME THRU DD-NEW-FRAME-EXIT.
        GO TO 085-END-OF-FRAME-RTN.
081-CHECK-OVERFLOW-SKIP-TP-NSI.
        IF ABC-NSI-TP-DAY-CODE = PREV-TP-DAY-CODE
                GO TO 085-END-OF-FRAME-RTN.
        PERFORM DD-NEW-FRAME THRU DD-NEW-FRAME-EXIT.
        GO TO 085-END-OF-FRAME-RTN.
085-END-OF-FRAME-RTN.
        PERFORM EE-TITLES THRU EE-TITLES-EXIT.
        PERFORM FF-HEADINGS THRU FF-HEADINGS-EXIT.
        PERFORM UU-SUBHEADINGS THRU UU-SUBHEADINGS-EXIT.
        PERFORM GG-UPDATE-INDEX THRU GG-UPDATE-INDEX-EXIT.
                GO TO 205-PROCESS-RECORD.
090-TOTAL-REC.
        IF ABC-RECORD-TYPE = 'D' OR 'B',
                GO TO 105-TP-REPORT.
        PERFORM HH-WRITe-TOTAL-REC THRU HH-WRITE-TOTAL-REC-EXIT.
        GO TO 205-PROCESS-RECORD.
105-TP-REPORT.
        IF ABC-RPT-TYPE NOT = 8,
                GO TO 130-PA-REPORT.
        GO TO 110-TP-REPORT.
110-TP-REPORT.
        IF ABC-RATING-COMP = 'A',
                GO TO 111-CHECK-END-OF-DAY-ARB.
        GO TO 111-CHECK-END-OF-DAY-NSI.
111-CHECK-END-OF-DAY-ARB.
        IF ABC-ARB-DAY-CODE = PREV-TP-DAY-CODE
                GO TO 112-CHECK-END-OF-TP-ARB.
        GO TO 121-END-OF-DAY-TP-RTN.
111-CHECK-END-OF-DAY-NSI.
        IF ABC-NSI-TP-DAY-CODE = PREV-TP-DAY-CODE
                GO TO 112-CHECK-END-OF-TP-NSI.
        GO TO 121-END-OF-DAY-TP-RTN.
112-CHECK-END-OF-TP-ARB.
        IF ABC-ARB-QTR-HR-SEQ = PREV-TP-TIME-PERIOD
                GO TO 205-PROCESS-RECORD.
        GO TO 120-END-OF-TIME-TP-RTN.
112-CHECK-END-OF-TP-NSI.
        IF ABC-NSI-TP-QTR-HR = PREV-TP-TIME-PERIOD
                GO TO 205-PROCESS-RECORD.
        GO TO 120-END-OF-TIME-TP-RTN.
120-END-OF-TIME-TP-RTN.
        PERFORM H-SUBHEAD-TP-TIME THRU H-SUBHEAD-TP-TIME-EXIT.
        GO TO 205-PROCESS-RECORD.
121-END-OF-DAY-TP-RTN.
        PERFORM MM-PAGE-MATRIX THRU MM-PAGE-MATRIX-EXIT.
        PERFORM SS-NEXT-FRAME THRU SS-NEXT-FRAME-EXIT.
        PERFORM DD-NEW-FRAME THRU DD-NEW-FRAME-EXIT.
        PERFORM EE-TITLES THRU EE-TITLES-EXIT.
        PERFORM FF-HEADINGS THRU FF-HEADINGS-EXIT.
        PERFORM UU-SUBHEADINGS THRU UU-SUBHEADINGS-EXIT.
        PERFORM GG-UPDATE-INDEX THRU GG-UPDATE-INDEX-EXIT.
        GO TO 205-PROCESS-RECORD.
130-PA-REPORT.
        IF ABC-RPT-TYPE NOT = 7,
                GO TO 155-DP-REPORT.
        GO TO 135-PA-REPORT.
135-PA-REPORT.
        IF ABC-RATING-COMP = 'A',
                GO TO 136-CHECK-END-OF-TP-ARB.
        GO TO 136-CHECK-END-OF-TP-NSI.
136-CHECK-END-OF-TP-ARB.
        IF ABC-ARB-QTR-HR-SEQ = PREV-PA-TIME-PERIOD.
                GO TO 137-CHECK-END-OF-STATION-ARB.
        GO TO 145-END-OF-TIME-PA-RTN.
136-CHECK-END-OF-TP-NSI.
        IF ABC-NSI-PP-QTR-HR = PREV-PA-TIME-PERIOD.
                GO TO 137-CHECK-END-OF-STATION-NSI.
        GO TO 145-END-OF-TIME-PA-RTN.
137-CHECK-END-OF-STATION-ARB.
        IF ABC-ARB-CALL-LETR = PREV-PA-STATION
                GO TO 205-PROCESS-RECORD.
        GO TO 145-END-OF-STATION-PA-RTN.
137-CHECK-END-OF-STATION-NSI.
        IF ABC-NSI-PP-CALL-LETR = PREV-PA-STATION
                GO TO 205-PROCESS-RECORD.
        GO TO 145-END-OF-STATION-PA-RTN.
145-EN-OF-TIME-PA-RTN.
        PERFORM L-DASH-LINE THRU L-DASH-LINE-EXIT.
        PERFORM I-SUBHEAD-PA-TIME THRU I-SUBHEAD-PA-TIME-EXIT
        MOVE I TO STATION-SWITCH.
        GO TO 205-PROCESS-RECORD.
145-END-OF-STATION-PA-RTN.
```

-continued

```
            PERFORM P-BLANK-LINE THRU P-BLANK-LINE-EXIT.
            MOVE 1 TO STATION-SWITCH.
            GO TO 205-PROCESS-RECORD.
155-CP-REPORT.
        IF ABC-RPT-TYPE NOT = 5.
                 GO TO 185-NA-REPORT.
        IF ABC-RATING-COMP = 'A'.
                 GO TO 160-DP-ARB-REPORT.
        GO TO 160-DP-NSI-REPORT.
160-DP-ARB-REPORT.
        IF ABC-ARB-DAY-CODE = PREV-DP-DAY-CODE.
                 GO TO 161-CHECK-FOR DAYPART.
        GO TO 160-DP-REPORT.
160-DP-NSI-REPORT.
        IF ABC-NSI-DP-RPI-DAY = PREV-DP-NSI-DAY-CODE.
                 GO TO 161-CHECK-FOR-DAYPART.
        GO TO 160-DP-REPORT.
160-DP-REPORT.
        PERFORM L-DASH-LINE THRU L-DASH-LINE-EXIT.
        PERFORM J-SUBHEAD-DP-DAY THRU J-SUBHEAD-DP-DAY-EXIT.
        PERFORM J-SUBHEAD-DP-DAYPART THRU J-SUBHEAD-DP-DAYPART-EXIT.
                 GO TO 205-PROCESS-RECORD.
161-CHECK-FOR-DAYPART.
        IF ABC-RATING-CCMP = 'A'.
                 GO TO 161-CHECK-FOR-DAYPART-ARB.
        GO TO 161-CHECK-FOR-DAYPART-NSI.
161-CHECK-FOR-DAYPART-ARB.
        IF ABC-ARB-DAYPART-CODE = PREV-DP-DAYPART
                 GO TO 205-PROCESS-RECORD.
        GO TO 162-CHECK-FOR-DAYPART.
161-CHECK-FOR-DAYPART-NSI.
        IF ABC-NSI-DP-PPT-TIME = PREV-DP-NSI-DAYPART-CODE
                 GO TO 205-PROCESS-RECORD.
        GO TO 162-CHECK-FOR-DAYPART.
162-CHECK-FOR-DAYPART.
        PERFORM L-DASH-LINE THRU L-DASH-LINE-EXIT.
        PERFORM J-SUBHEAD-DP-DAYPART THRU J-SUBHEAD-DP-DAYPART-EXIT.
                 GO TO 205-PROCESS-RECORD.
185-NA-REPORT.
        IF ABC-ARB-DAY-CODE = PREV-NA-DAY-CODE.
                 GO TO 186-CHECK-FOR-DAYPART.
        PERFORM L-DASH-LINE THRU L-DASH-LINE-EXIT.
        PERFORM J-SUBHEAD-DP-DAY THRU J-SUBHEAD-DP-DAY-EXIT.
        PERFORM J-SUBHEAD-DP-DAYPART THRU J-SUBHEAD-DP-DAYPART-EXIT.
        GO TO 205-PROCESS-RECORD.
186-CHECK-FOR-DAYPART.
        IF ABC-ARB-DAYPART-CODE = PREV-NA-DAYPART
                 GO TO 205-PROCESS-RECORD.
        PERFORM L-DASH-LINE THRU L-DASH-LINE-EXIT.
        PERFORM J-SUBHEAD-DP-DAYPART THRU J-SUBHEAD-DP-DAYPART-EXIT.
                 GO TO 205-PROCESS-RECORD.
205-PROCESS-RECORD.
        IF ABC-RECORD-TYPE = 'T'
                 GO TO 210-STORE-TOTAL-REC.
        GO TO 220-FORMAT-DETAIL-RECORD.
210-STORE-TOTAL-REC.
        MOVE ABC-COMMON-RECORD TO WS-TOTAL-RECORD-STORED.
        GO TO 010-READ-FILE-RTN.
220-FORMAT-DETAIL-RECORD.
        PERFORM M-FORMAT-REC THRU M-FORMAT-REC-EXIT.
225-WRITE-RTN.
        PERFORM BB-STORE-INFORMATION THRU BB-STORE-INFORMATION-EXIT.
        GO TO 010-READ-FILE-RTN.
235-EOF-ABC-RTN.
        IF PREV-REP-TYPE = 5 OR 8,
                 PERFORM HH-WRITE-TOTAL-REC THRU HH-WRITE-TOTAL-REC-EXIT.
        PERFORM MM-PAGE-MATRIX THRU MM-PAGE-MATRIX-EXIT.
        PERFORM SS-NEXT-FRAME THRU SS-NEXT-FRAME-EXIT
        PERFORM TT-INDEX-FRAME THRU TT-INDEX-FRAME-EXIT
        PERFORM II-WRITE-INDEX THRU II-WRITE-INDEX-EXIT.
        PERFORM MM-PAGE-MATRIX THRU MM-PAGE-MATRIX-EXIT.
        PERFORM XX-CHECK-RERUN THRU XX-CHECK-RERUN-EXIT.
        PERFORM JJ-WRITE-LABEL THRU JJ-WRITE-LABEL-EXIT.
        IF USED-FICHE-SWITCH = 0,
                 PERFORM KK-UPDATE-MKT-FILE THRU KK-UPDATE-MKT-FILE-EXIT.
        PERFORM NN-UPDATE-DUMMY THRU NN-UPDATE-DUMMY-EXIT.
235-CLOSE-FILE-RTN.
        CLOSE ABC-FILE WITH LOCK.
                 MKT-RFILE WITH LOCK.
235-SORT-MARKET-FILE.
        SORT NKT-TO-SORT
                 ASCENDING KEY SORT-MKT-NAME
                 INPUT PROCEDURE IS 235-SORTING
                 GIVING MKT-SORTED.
235-SORT-MARKET-FILE-2.
        GO TO 235-EDF-MASTER-INDEX.
235-EDF-MASTER-INDEX.
        OPEN INPUT MKT-SORTED.
        PERFORM CC-NEW-FICHE THRU CC-NEW-FICHE-EXIT.
        PERFORM PP-MASTER-INDEX THRU PP-MASTER-INDEX-EXIT.
        MOVE 0 TO FICHE-NUMBER
        MOVE 'MASTER-INDEX' TO FL-MKT-NAME
        PERFORM JJ-WRITE-LABEL THRU JJ-WRITE-LABEL-EXIT.
```

```
236-CLOSE-FILE-RTN.
     CLOSE COM-FILE WITH LOCK.
          MKT-SORTED WITH LOCK.
240-BACK-UP-FILE.
     OPEN INPUT MKT-SFILE
          OUTPUT MKT-TFILE.
241-BACK-UP-FILE.
     READ MKT-SFILE, AT END GO TO 245-END-OF-JOB.
     MOVE ABC-MKT-RECORD-IN TO ABC-MKT-RECORD-OUT
     WRITE ABC-MKT-RECORD-OUT
     GO TO 241-BACK-UP-FILE.
245-END-OF-JOB.
     CLOSE MKT-SFILE WITH LOCK
          MKT-TFILE WITH LOCK.
     STOP RUN.
BB-STORE-INFORMATION.
     MOVE ABC-MRKT-CODE TC PREV-MARKET-CODE.
     MOVE ABC-RATING-COMP TO PREV-RATING-COMP.
     MOVE ABC-RPT-TYPE TO PREV-REP-TYPE.
     MOVE ABC-RPT-MONTH TC PREV-RPT-MONTH.
     MOVE ABC-RPT-YEAR TO PREV-RPT-YEAR.
     IF ABC-RPT-TYPE = 8 AND ABC-RATING-COMP = 'A',
          MOVE ABC-ARB-DAY-CODE TO PREV-TP-DAY-CODE,
          MOVE ABC-ARB-QTR-HR-SEQ TO PREV-TP-TIME-PERIOD,
          MOVE ABC-ARB-CALL-LETR TO PREV-TP-STATION,
          GO TO BB-STORE-INFORMATION-EXIT.
     IF ABC-RPT-TYPE = 8 AND ABC-RATING-COMP = 'N',
          MOVE ABC-NSI-TP-DAY-CODE TO PREV-TP-DAY-CODE,
          MOVE ABC-NSI-TP-QTR-HR TO PREV-TP-TIME-PERIOD,
          MOVE ABC-NSI-TP-STAT-CALL TO PREV-TP-STATION,
          GO TO BB-STORE-INFORMATION-EXIT.
     IF ABC-RPT-TYPE = 7 AN ABC-RATING-CCMP = 'A',
          MOVE ABC-ARB-QTR-HR-SEQ TO PREV-PA-TIME-PERIOD,
          MOVE ABC-ARB-CALL-LETR TO PREV-PA-STATION,
          GO TO BB-STORE-INFORMATION-EXIT.
     IF ABC-RPT-TYPE = 7 AND ABC-RATING-COMP = 'N',
          MOVE ABC-NSI-PP-QTR-HR TO PREV-PA-TIME-PERIOD,
          MOVE ABC-NSI-PP-CALL-LETR TO PREV-PA-STATION,
          GO TO BB-STORE-INFORMATION-EXIT.
     IF ABC-RPT-TYPE = 5 AND ABC-RATING-COMP = 'A',
          MOVE ABC-ARB-DAY-CODE TO PREV-DP-DAY-CODE
          MOVE ABC-ARB-DAYPART-CODE TO PREV-DP-DAYPART
          GO TO BB-STORE-INFORMATION-EXIT.
     IF ABC-RPT-TYPE = 5 AND ABC-RATING-COMP = 'N',
          MOVE ABC-NSI-CP-RPT-DAY TO PREV-DP-NSI-DAY-CODE
          MOVE ABC-NSI-DP-RPT-TIME TO PREV-DP-NSI-DAYPART-CODE,
          GO TO BB-STORE-INFORMATION-EXIT.
     IF ABC-RPT-TYPE = 6,
          MOVE ABC-ARB-DAY-CODE TO PREV-NA-DAY-CODE,
          MOVE ABC-ARB-DAYPART-CODE TO PREV-NA-DAYPART,
          GO TO BB-STORE-INFORMATION-EXIT.
BB-STORE-INFORMATION-EXIT.
     EXIT.
CC-NEW-FICHE.
     MOVE 'AW' TO COM-CONTROLS.
     PERFORM ZZ-WRITE-REC THRU ZZ-WRITE-REC-EXIT.
     IF USED-FICHE-SWITCH = 0,
          ADD 1 TO FICHE-COUNT-NUMBER.
     MOVE 0 TO USED-FICHE-SWITCH.
     MOVE 1 TO FRAME-PAGE-COUNT.
CC-NEW-FICHE-EXIT.
     EXIT.
DD-NEW-FRAME.
     IF ABC-RATING-COMP = 'N'
          GO TO DD-NEW-FRAME-NSI.
DD-NEW-FRAME-ARB.
     IF ABC-RPT-TYPE = 5,
          GO TO DD-NEW-FRAME-EXIT.
     IF ABC-RPT-TYPE = 6,
          GO TO DD-FRAME-6.
     IF ABC-RPT-TYPE = 7,
          GO TO DD-FRAME-7.
     IF ABC-RPT-TYPE = 8,
          GO TO DD-FRAME-TP-ARB.
DD-FRAME-6.
   MOVE 6 TO FRAME-PAGE-COUNT.
   MOVE ' B' TO COM-CONTROLS.
   MOVE '06' TO SHIFT-IN.
   PERFORM ZZ-WRITE-REC THRU ZZ-WRITE-REC-EXIT.
   MOVE ' C' TO COM-CONTROLS.
   MOVE 'DD' TO SHIFT-IN.
   PERFORM ZZ-WRITE-REC THRU ZZ-WRITE-REC-EXIT.
   GO TO DD-NEW-FRAME-EXIT.
DD-FRAME-7.
   MOVE 7 TO FRAME-PAGE-COUNT.
   MOVE ' B' TO COM-CONTROLS.
   MOVE '05' TO SHIFT-IN.
   PERFORM ZZ-WRITE-REC THRU ZZ-WRITE-REC-EXIT.
   MOVE ' C' TO COM-CONTROLS.
   MOVE '00' TO SHIFT-IN.
   PERFORM ZZ-WRITE-REC THRU ZZ-WRITE-REC-EXIT.
   GO TO DD-NEW-FRAME-EXIT.
DD-FRAME-TP-ARB.
```

```
        IF ABC-ARB-DAY-CODE = 0, GO TO DD-FRAME-30.
        IF ABC-ARB-DAY-CODE = 1, GO TO DD-FRAME-40.
        IF ABC-ARB-DAY-CODE = 2, GO TO DD-FRAME-47.
        IF ABC-ARB-DAY-CODE = 3, GO TO DD-FRAME-54.
        IF ABC-ARB-DAY-CODE = 4, GO TO DD-FRAME-61.
        IF ABC-ARB-DAY-CODE = 5, GO TO DD-FRAME-68.
        IF ABC-ARB-DAY-CODE = 6, GO TO DD-FRAME-75.
        IF ABC-ARB-DAY-CODE = 7, GO TO DD-FRAME-85.
DD-FRAME-30.
    MOVE 30 TO FRAME-PAGE-COUNT.
    MOVE ' B' TO COM-CONTROLS.
    MOVE '06' TO SHIFT-IN.
    PERFORM ZZ-WRITE-REC THRU ZZ-WRITE-REC-EXIT.
    MOVE ' C' TO COM-CONTROLS.
    MOVE '02' TO SHIFT-IN.
    PERFORM ZZ-WRITE-REC THRU ZZ-WRITE-REC-EXIT.
    GO TO DD-NEW-FRAME-EXIT.
DD-FRAME-40.
    MOVE 40 TO FRAME-PAGE-COUNT.
    MOVE ' B' TO COM-CONTROLS.
    MOVE '10' TO SHIFT-IN.
    PERFORM ZZ-WRITE-REC THRU ZZ-WRITE-REC-EXIT.
    MOVE ' C' TO COM-CONTROLS.
    MOVE '03' TO SHIFT-IN.
    PERFORM ZZ-WRITE-REC THRU ZZ-WRITE-REC-EXIT.
    GO TO DD-NEW-FRAME-EXIT.
DD-FRAME-47.
    MOVE 47 TO FRAME-PAGE-COUNT.
    MOVE ' B' TO COM-CONTROLS.
    MOVE '01' TO SHIFT-IN.
    PERFORM ZZ-WRITE-REC THRU ZZ-WRITE-REC-EXIT.
    MOVE ' C' TO COM-CONTROLS.
    MOVE '03' TO SHIFT-IN.
    PERFORM ZZ-WRITE-REC THRU ZZ-WRITE-REC-EXIT.
    GO TO DD-NEW-FRAME-EXIT.
DD-FRAME-54.
    MOVE 54 TO FRAME-PAGE-COUNT.
    MOVE ' B' TO COM-CONTROLS.
    MOVE '06' TO SHIFT-IN.
    PERFORM ZZ-WRITE-REC THRU ZZ-WRITE-REC-EXIT.
    MOVE ' C' TO COM-CONTROLS.
    MOVE '04' TO SHIFT-IN.
    PERFORM ZZ-WRITE-REC THRU ZZ-WRITE-REC-EXIT.
    GO TO DD-NEW-FRAME-EXIT.
DD-FRAME-61.
    MOVE 61 TO FRAME-PAGE-COUNT.
    MOVE ' B' TO COM-CONTROLS
    MOVE '13' TO SHIFT-IN.
    PERFORM ZZ-WRITE-REC THRU ZZ-WRITE-REC-EXIT.
    MOVE ' C' TO COM-CONTROLS.
    MOVE '05' TO SHIFT-IN.
    PERFORM ZZ-WRITE-REC THRU ZZ-WRITE-REC-EXIT.
    GO TO DD-NEW-FRAME-EXIT.
DD-FRAME-68.
    MOVE 68 TO FRAME-PAGE-COUNT.
    MOVE ' B' TO COM-CONTROLS.
    MOVE '04' TO SHIFT-IN.
    PERFORM ZZ-WRITE-REC THRU ZZ-WRITE-REC-EXIT.
    MOVE ' C' TO COM-CONTROLS.
    MOVE '05' TO SHIFT-IN.
    PERFORM ZZ-WRITE-REC THRU ZZ-WRITE-REC-EXIT.
    GO TO DD-NEW-FRAME-EXIT.
DD-FRAME-75.
    MOVE 75 TO FRAME-PAGE-COUNT.
    MOVE ' B' TO COM-CONTROLS.
    MOVE '11' TO SHIFT-IN.
    PERFORM ZZ-WRITE-REC THRU ZZ-WRITE-REC-EXIT.
    MOVE ' C' TO COM-CONTROLS.
    MOVE '06' TO SHIFT-IN.
    PERFORM ZZ-WRITE-REC THRU ZZ-WRITE-REC-EXIT.
    GO TO DD-NEW-FRAME-EXIT.
DD-FRAME-85.
    MOVE 85 TO FRAME-PAGE-COUNT.
    MOVE ' B' TO COM-CONTROLS.
    MOVE '13' TO SHIFT-IN.
    PERFORM ZZ-WRITE-REC THRU ZZ-WRITE-REC-EXIT.
    MOVE ' C' TO COM-CONTROLS.
    MOVE '07' TO SHIFT-IN.
    PERFORM ZZ-WRITE-REC THRU ZZ-WRITE-REC-EXIT.
    GO TO DD-NEW-FRAME-EXIT.
DD-FRAME-NSI.
    IF ABC-RPT-TYPE = 8,
            GO TO DD-FRAME-TP-NSI.
    IF ABC-RPT-TYPE = 7,
            GO TO DD-FRAME-103.
    IF ABC-RPT-TYPE = 5,
            GO TO DD-FRAME-97.
    GO TO DD-FRAME-102.
DD-FRAME-97.
    MOVE 97 TO FRAME-PAGE-COUNT.
    MOVE ' B' TO COM-CONTROLS.
    MOVE '13' TO SHIFT-IN.
    PERFORM ZZ-WRITE-REC THRU ZZ-WRITE-REC-EXIT.
```

```
            MOVE ' C' TO COM-CONTROLS.
            MOVE '10' TO SHIFT-IN.
            PERFORM ZZ-WRITE-REC THRU ZZ-WRITE-REC-EXIT.
            GO TO DD-NEW-FRAME-EXIT.
    DD-FRAME-102.
            MOVE 102 TO FRAME-PAGE-COUNT.
            MOVE ' B' TO COM-CONTROLS.
            MOVE '06' TO SHIFT-IN.
            PERFORM ZZ-WRITE-REC THRU ZZ-WRITE-REC-EXIT.
            MOVE ' C' TO COM-CONTROLS.
            MOVE '10' TO SHIFT-IN.
            PERFORM ZZ-WRITE-REC THRU ZZ-WRITE-REC-EXIT.
            GO TO DD-NEW-FRAME-EXIT.
    DD-FRAME-103.
            MOVE 103 TO FRAME-PAGE-COUNT
            MOVE ' B' TO COM-CONTROLS.
            MOVE '05' TO SHIFT-IN.
            PERFORM ZZ-WRITE-REC THRU ZZ-WRITE-REC-EXIT.
            MOVE ' C' TO COM-CONTROLS.
            MOVE '10' TO SHIFT-IN.
            PERFORM ZZ-WRITE-REC THRU ZZ-WRITE-REC-EXIT.
            GO TO DD-NEW-FRAME-EXIT.
    DD-FRAME-TP-NSI.
            IF ABC-NSI-TP-DAY-CODE = 2, GO TO DD-FRAME-136.
            IF ABC-NSI-TP-DAY-CODE = 3, GO TO DD-FRAME-143.
            IF ABC-NSI-TP-DAY-CODE = 4, GO TO DD-FRAME-150.
            IF ABC-NSI-TP-DAY-CODE = 5, GO TO DD-FRAME-157.
            IF ABC-NSI-TP-DAY-CODE = 6, GO TO DD-FRAME-164.
            IF ABC-NSI-TP-DAY-CODE = 7, GO TO DD-FRAME-171.
            IF ABC-NSI-TP-DAY-CODE = 8, GO TO DD-FRAME-181.
            IF ABC-NSI-TP-DAY-CODE = 9, GO TO DD-FRAME-126.
    DD-FRAME-136.
            MOVE 136 TO FRAME-PAGE-COUNT.
            MOVE ' B' TO COM-CONTROLS.
            MOVE '10' TO SHIFT-IN.
            PERFORM ZZ-WRITE-REC THRU ZZ-WRITE-REC-EXIT.
            MOVE ' C' TO COM-CONTROLS.
            MOVE '13' TO SHIFT-IN.
            PERFORM ZZ-WRITE-REC THRU ZZ-WRITE-REC-EXIT.
            GO TO DD-NEW-FRAME-EXIT.
    DD-FRAME-143.
            MOVE 143 T0 FRAME-PAGE-COUNT.
            MOVE ' B' TO COM-CONTROLS.
            MOVE '01' TO SHIFT-IN.
            PERFORM ZZ-WRITE-REC THRU ZZ-WRITE-REC-EXIT.
            MOVE ' C' TO COM-CONTROLS.
            MOVE '13' TO SHIFT-IN.
            PERFORM ZZ-WRITE-REC THRU ZZ-WRITE-REC-EXIT.
            GO TO DD-NEW-FRAME-EXIT.
    DD-FRAME-150.
            MOVE 150 TO FRAME-PAGE-COUNT.
            MOVE ' B' TO COM-CONTROLS.
            MOVE '06' TO SHIFT-IN.
            PERFORM ZZ-WRITE-REC THRU ZZ-WRITE-REC-EXIT.
            MOVE ' C' TO COM-CONTROLS.
            MOVE '14' TO SHIFT-IN.
            PERFORM ZZ-WRITE-REC THRU ZZ-WRITE-REC-EXIT.
            GO TO DD-NEW-FRAME-EXIT.
    DD-FRAME-157.
            MOVE 157 TO FRAME-PAGE-COUNT.
            MOVE ' B' TO COM-CONTROLS.
            MOVE '13' TO SHIFT-IN.
            PERFORM ZZ-WRITE-REC THRU ZZ-WRITE-REC-EXIT.
            MOVE ' C' TO COM-CONTROLS.
            MOVE '15' TO SHIFT-IN.
            PERFORM ZZ-WRITE-REC THRU ZZ-WRITE-REC-EXIT.
            GO TO DD-NEW-FRAME-EXIT.
    DD-FRAME-164.
            MOVE 164 TO FRAME-PAGE-COUNT.
            MOVE ' B' TO COM-CONTROLS.
            MOVE '04' TO SHIFT-IN.
            PERFORM ZZ-WRITE-REC THRU ZZ-WRITE-REC-EXIT.
            MOVE ' C' TO COM-CONTROLS.
            MOVE '15' TO SHIFT-IN.
            PERFORM ZZ-WRITE-REC THRU ZZ-WRITE-REC-EXIT.
            GO TO DD-NEW-FRAME-EXIT.
    DD-FRAME-171.
            MOVE 171 TO FRAME-PAGE-COUNT.
            MOVE ' B' TO COM-CONTROLS.
            MOVE '11' TO SHIFT-IN.
            PERFORM ZZ-WRITE-REC THRU ZZ-WRITE-REC-EXIT.
            MOVE ' C' TO COM-CONTROLS.
            MOVE '16' TO SHIFT-IN.
            PERFORM ZZ-WRITE-REC THRU ZZ-WRITE-REC-EXIT.
            GO TO DD-NEW-FRAME-EXIT.
    DD-FRAME-181.
            MOVE 181 TO FRAME-PAGE-COUNT.
            MOVE ' B' TO COM-CONTROLS.
            MOVE '13' TO SHIFT-IN.
            PERFORM ZZ-WRITE-REC THRU ZZ-WRITE-REC-EXIT.
            MOVE ' C' TO COM-CONTROLS.
            MOVE '17' TO SHIFT-IN.
            PERFORM ZZ-WRITE-REC THRU ZZ-WRITE-REC-EXIT.
```

```
            GO TO DD-NEW-FRAME-EXIT.
DD-FRAME-126.
        MOVE 126 TO FRAME-PAGE-COUNT.
        MOVE ' B' TO COM-CONTROLS.
        MOVE '06' TO SHIFT-IN.
        PERFORM ZZ-WRITE-REC THRU ZZ-WRITE-REC-EXIT.
        MOVE ' C' TO COM-CONTROLS.
        MOVE '12' TO SHIFT-IN.
        PERFORM ZZ-WRITE-REC THRU ZZ-WRITE-REC-EXIT.
        GO TO DD-NEW-FRAME-EXIT.
DD-NEW-FRAME-EXIT.
        EXIT.
EE-TITLES.
        MOVE FRAME-PAGE-COUNT TO FPC.
        IF FPC = 1,
                    MOVE SPACES TO TR-PREV-PAGE
                    ADD 1 TO FPC
                    MOVE MAT (FPC) TO TR-NEXT-PAGE
                    GO TO EE-2-TITLES.
        SUBTRACT 1 FROM FPC
        MOVE MAT (EPC) TO TR-PREV-PAGE
        ADD 2 TO FPC
        MOVE MAT (FPC) TO TR-NEXT-PAGE.
EE-2-TITLES.
        MOVE TITLE-FOR-ALL-REPORTS TO TEXT-OUT.
        MOVE '+ ' TO COM-CONTROLS.
        MOVE ' −' TO SHIFT-IN.
        PERFORM ZZ-WRITE-REC THRU ZZ-WRITE-REC-EXIT.
        MOVE 1 TO LINE-COUNT.
EE-TITLES-EXIT.
        EXIT.
FF-HEADINGS.
        IF ABC-RPT-TYPE = 8,
                MOVE DAY-AND-TIME TO SUBTITLE
                MOVE ASTERIKS4 TO ASTERIKS
                MOVE SUBTITLE-FOR-ALL-REPORTS TO TEXT-OUT
                MOVE '0 ' TO COM-CONTROLS,
                PERFORM ZZ-WRITE-REC THRU ZZ-WRITE-REC-EXIT
                ADD 2 TO LINE-COUNT
                MOVE SPACES T0 SUBTITLE
                MOVE ASTERIKS1 TO ASTERIKS
                MOVE ' ' TO COM-CONTROLS
                MOVE SUBTITLE-FOR-ALL-REPORTS TO TEXT-OUT
                PERFORM ZZ-WRITE-REC THRU ZZ-WRITE-REC-EXIT
                ADD 1 TO LINE-COUNT
                MOVE STATION-PROGRAM TO SUBTITLE
                MOVE SPACES TO ASTERIKS
                MOVE ' ' TO COM-CONTROLS
                MOVE SUBTITLE-FOR-ALL-REPORTS TO TEXT-OUT
                PERFORM ZZ-WRITE-REC THRU ZZ-WRITE-REC-EXIT
                ADD 1 TO LINE-COUNT
                    MOVE 1 TO STATION-SWITCH,
                GO TO FF-HEADINGS-EXIT.
        IF ABC-RPT-TYPE = 7,
                MOVE TIME-STATION TO SUBTITLE
                MOVE ASTERIKS4 TO ASTERIKS
                    MOVE SUBTITLE-FOR-ALL-REPORTS TO TEXT-OUT
                MOVE '0 ' TO COM-CONTROLS
                PERFORM ZZ-WRITE-REC THRU ZZ-WRITE-REC-EXIT
                add 2 TO LINE-COUNT
                MOVE SPACES TO SUBTITLE
                MOVE ASTERIKS1 TO ASTERIKS
                    MOVE SUBTITLE-FOR-ALL-REPORTS TO TEXT-OUT
                MOVE ' ' TO COM-CONTROLS
                PERFORM ZZ-WRITE-REC THRU ZZ-WRITE-REC-EXIT
                ADD 1 TO LINE-COUNT
                MOVE DAY-PROGRAM TO SUBTITLE
                MOVE SPACES TO ASTERIKS
                    MOVE SUBTITLE-FOR-ALL-REPORTS TO TEXT-OUT
                MOVE ' ' TO COM-CONTROLS
                PERFORM ZZ-WRITE-REC THRU ZZ-WRITE-REC-EXIT
                ADD 1 TO LINE-COUNT
                    MOVE 1 TO STATION-SWITCH,
                GO TO FF-HEADINGS-EXIT.
        IF ABC-RPT-TYPE = 6.
                MOVE DAYPART TO SUBTITLE
                MOVE SPACES TO ASTERIKS
                MOVE SUBTITLE-FOR-ALL-REPORTS TO TEXT-OUT
                MOVE '0 ' TO COM-CONTROLS
                PERFORM ZZ-WRITE-REC THRU ZZ-WRITE-REC-EXIT
                ADD 2 TO LINE-COUNT
                MOVE NETWORK TO SUBTITLE
                MOVE ASTERIKS1 TO ASTERIKS
                MOVE SUBTITLE-FOR-ALL-REPORTS TO TEXT-OUT
                MOVE '0 ' TO COM-CONTROLS
                PERFORM ZZ-WRITE-REC THRU ZZ-WRITE-REC-EXIT
                ADD 2 TO LINE-COUNT
                MOVE SPACES TO SUBTITLE
                MOVE ASTERIKS2 TC ASTERIKS
                MOVE SUBTITLE-FOR-ALL-REPORTS TO TEXT-OUT
                MOVE ' ' TO COM-CONTROLS
                PERFORM ZZ-WRITE-REC THRU ZZ-WRITE-REC-EXIT
                ADD 1 TO LINE-COUNT
```

-continued
```
                MOVE ASTERIKS3 TO ASTERIKS
                MOVE SUBTITLE-FOR-ALL-REPORTS TO TEXT-OUT
                PERFORM ZZ-WRITE-REC THRU ZZ-WRITE-REC-EXIT
                ADD 1 TO LINE-COUNT
                GO TO FF-HEADINGS-EXIT.
          MOVE DAYPART TO SUBTITLE
          MOVE SPACES TO ASTERIKS
          MOVE SUBTITLE-FOR-ALL-REPORTS TO TEXT-OUT
          MOVE '0 ' TO COM-CONTROLS
          PERFORM ZZ-WRITE-REC THRU ZZ-WRITE-REC-EXIT
          ADD 2 TO LINE-COUNT
          MOVE NETWORK TO SUBTITLE
          MOVE SPACES TO ASTERIKS
          MOVE SUBTITLE-FOR-ALL-REPORTS TO TEXT-OUT
          MOVE ' ' TO COM-CONTROLS
          PERFORM ZZ-WRITE-REC THRU ZZ-WRITE-REC-EXIT
          ADD 1 TO LINE-COUNT
          MOVE STATION TO SUBTITLE
          MOVE ASTERIKS1 TO ASTERIKS
          MOVE SUBTITLE-FOR-ALL-REPORTS TO TEXT-OUT
          MOVE ' ' TO COM-CONTROLS
          PERFORM ZZ-WRITE-REC THRU ZZ-WRITE-REC-EXIT
          ADD 1 TO LINE-COUNT
          MOVE CHANNEL TO SUBTITLE
          MOVE ASTERIKS2 TO ASTERIKS
          MOVE SUBTITLE-FOR-ALL-REPORTS TO TEXT-OUT
          MOVE ' ' TO COM-CONTROLS
          PERFORM ZZ-WRITE-REC THRU ZZ-WRITE-REC EXIT
          ADD 1 TO LINE-COUNT
          MOVE SPACES TO SUBTITLE
          MOVE ASTERIKS3 TO ASTERIKS
          MOVE SUBTITLE FOR-ALL-REPORTS TO TEXT-OUT
          PERFORM ZZ-WRITE-REC THRU ZZ-WRITE-REC-EXIT
          ADD 1 TO LINE-COUNT.
FF-HEADINGS-EXIT.
     EXIT.
GG-UPDATE-INDEX.
     IF ABC-RPT-TYPE = 8,
          MOVE SPACES TO INDEX-TEXT-DAYPART
          MOVE MAT (FRAME-PACE-COUNT) TO INDEX-PAGE NO (INDEX-SUBS)
          MOVE INDEX-TP-CLAY TO INDEX-DAY
          MOVE INDEX-TP-TIME TO INDEX-TIME-PERIOD
          MOVE INDEX-TEXT-TIME TO INDEX-REF (INDEX-SUBS)
          ADD 1 TO INDEX-SUBS
          GO TO GG-UPDATE-INDEX-EXIT.
     IF ABC-RPT-TYPE = 7,
          MOVE SPACES TO INDEX-TEXT-DAYPART
          MOVE MAT (FRAME-PAGE-COUNT) TO INDEX-PAGE NO (INDEX-SUBS)
          MOVE INDEX-PA-TIME TO INDEX-TIME
          MOVE INDEX-TEXT PROGRAM TD INDEX-REF (INDEX-SUBS)
          ADD 1 TO INDEX-SUBS
          GO TO GG-UPDATE-INDEX-EXIT.
     IF ABC-RPT-TYPE = 6,
          MOVE SPACES TO INDEX-TEXT-DAYPART
          MOVE 'ALL DAYPARTS & NETWORKS' TO INDEX-LITERAL
          MOVE INDEX-TEXT-NETWORK TO INDEX-REF (INDEX-SUBS)
          MOVE MAT (FRAME-PAGE-COUNT) TO INDEX-PAGE NO (INDEX-SUBS)
          ADD 1 TO INDEX-SUBS
          GO TO GG-UPDATE-INDEX-EXIT.
                    MOVE SPACES TO INDEX-TEXT-DAYPART
               MOVE MAT (FRAME-PAGE-COUNT) TO INDEX-PAGE NO (INDEX-SUBS)
                    MOVE INDEX-DP-DAY TO INDEX-DAYPART
               MOVE INDEX-TEXT-DAYPART TD INDEX-REF (INDEX-REF (INDEX-SUBS)
                         ADD 1 TO INDEX-SUBS.
GG-UPDATE-INDEX-EXIT.
     EXIT.
HH-WRITE-TOTAL-REC.
     MOVE 'HUT + TOTALS ' TO HUTSTOTALS.
     MOVE WS-METRIC-RATING TO FIGURES-WORK-AREA
     PERFORM R-SIG-DIGIT-DEC THRU R-SIG-DIGIT-DEC-EXIT
     MOVE FWA-3D TO METRIC-RATING.
     MOVE WS-DMA-RATING TO FIGURES-WORK-AREA
     PERFORM R-SIG-DIGIT-DEC THRU R-SIG-DIGIT-DEC-EXIT
     MOVE FWA-3D TO DMA-RATING.
     MOVE WS-HH-TOT TO TOTAL-DISPLAYED.
     MOVE SIG-4D TO TV-HOUSEHOLD.
     MOVE WS-ADULTS TO TOTAL-DISPLAYED.
     MOVE SIG-4D TO TOT-ADULT.
     MOVE WS-WOMAN-TOT TO TOTAL-DISPLAYED.
     MOVE SIG-4D TO TOT-WOMEN.
     MOVE WS-WOM-1849 TO TOTAL-DISPLAYED.
     MOVE SIG-4D TO WOMEN-1849.
     MOVE WS-WCM-50 TO TOTAL DISPLAYED.
     MOVE SIG-4D TO WOMEN-50.
     MOVE WS-MEN-TOT TO TOTAL-DISPLAYED.
     MOVE SIG-4D TO TOT-MEN.
     MOVE WS-MEN-1849 TO TOTAL-DISPLAYED.
     MOVE SIG-4D TO MEN-1849.
     MOVE WS-MEN-50 TO TOTAL-DISPLAYED.
     MOVE SIG-4D TO MEN-50.
     MOVE WS-TEEN-TOT TO TOTAL-DISPLAYED.
     MOVE SIG-4D TO TOT-TEENS.
     MOVE WS-TEEN-GIRLS TO TOTAL-DISPLAYED.
```

```
                MOVE SIG-4D TO TEENS-GIRLS.
                MOVE WS-CHILD-TOT TO TOTAL-DISPLAYED.
                MOVE SIG-4D TO TOT-CHILDREN.
                MOVE WS-CHILD-611 TO TOTAL-DISPLAYED.
                MOVE SIG-4D TO CHILD-611.
                MOVE WS-DIST-METROL TO FIGURES-WORK-AREA
                PERFORM R-SIG-DIGIT-DEC THRU R-SIG-DIGIT-DEC-EXIT
                MOVE FWA-3D TO METRO-PERCENT.
                MOVE WS-DIST-HOME-ACI TO FIGURES-WORK-AREA
                PERFORM R-SIG-DIGIT-DEC THRU R-SIG-DIGIT-DEC-EXIT
                MOVE FWA-3D TO ADJ-PERCENT.
                IF W-BPT-TYPE = 8,
                        MOVE WS-TV-HH-WK1 TO FIGURES-WORK-AREA
                        PERFORM R-SIG-DIGIT-DEC THRU R-SIG-DIGIT-DEC-EXIT
                        MOVE FWA-2D TO ADJ-WEEK-1
                        MOVE WS-TV-HH-WK2 TO FIGURES-WORK-AREA
                        PERFORM P-SIG-DIGIT-DEC THRU R-SIG-DIGIT-DEC-EXIT
                        MOVE FWA-2D TO ADJ-WEEK-2
                        MOVE WS-TV-HH-WK3 TO FIGURES-WORK-AREA
                        PERFORM R-SIG-DIGIT-DEC THRU R-SIG-DIGIT-DEC-EXIT
                        MOVE FWA-2D TO ADJ-WEEK3
                        MOVE WS-TV-HH-WK4 TO FIGURES-WORK-AREA
                        PERFORM R-SIG-DIGIT-DEC THRU R-SIG-DIGIT-DEC-EXIT
                        MOVE FWA-2D TO WEEK4
                        GO TO HH-2-WRITE-TOTAL-REC.
                MOVE WS-ADJ-AD11 TO FIGURES-WORK-AREA
                PERFORM R-SIG-DIGIT-DEC THRU R-SIG-DIGIT-DEC-EXIT
                MOVE FWA-2D TO ADJ-WEEK-1
                MOVE WS-DJ-AD12 TO FIGURES-WORK-AREA
                PERFORM R-SIG-DIGIT-DEC THRU R-SIG-DIGIT-DEC-EXIT
                MOVE FWA-2D TO ADJ-WEEK-2
                MOVE WS-ADJ-AD13 TO FIGURES-WORK-AREA
                PERFORM R-SIG-DIGIT-DEC THRU R-SIG-DIGIT-DEC-EXIT
                MOVE FWA-2D TO ADJ-WEEK3.
        HH-2-WRITE-TOTAL-REC.
                PERFORM ZZ-WRITE-REC THRU ZZ-WRITE-REC-EXIT.
                ADD 1 TO LINE-COUNT.
        HH-WRITE-TOTAL-REC-EXIT.
                EXIT.
        II-WRITE-INDEX.
                MOVE TR-RATING-OO TO IT-COMPANY.
                MOVE TR-MKT-NAME TO IT-MARKET-NAME.
                MOVE TR-MONTH TO IT-MONTH.
                NOVE TR-YY TO IT-YY.
                MOVE INDEX-TITLE TO TEXT-OUT.
                MOVE '0' TO CCM-CONTROLS.
                PERFORM ZZ-WRITE-REC THRU ZZ-WRITE-REC-EXIT.
                MOVE '—' TO CCM-CONTROLS.
                PERFORM ZZ-WRITE-REC THRU ZZ-WRITE-REC-EXIT.
                MOVE 1 TO SUBS1.
                MOVE 49 TO SUBS2.
        II-2-WRITE-INDEX.
                IF SUBS1 > 48
                        GO TO II-WRITE-INDEX-WARNING.
                MOVE INDEX-SAVE (SUBS1) TO INDEX-REF-PAGE (1).
                MOVE INDEX-SAVE (SUBS2) TO INDEX-REF-PAGE (2).
                IF PAGE-INDEX (1) = 'A 1' OR 'A 9',
                        MOVE 'DAYPART SUMMARYS ' TO REPORT-TYPE-C1 (1)
                        MOVE ' TIME PERIOD AVERAGE ' TO REPORT-TYPE-C1 (2)
                        GO TO II-3-WRITE-INDEX.
                IF PAGE-INDEX (1) = 'F 1',
                        MOVE 'NETWORK AVERAGES ' TO REPORT-TYPE-C1 (1)
                        MOVE SPACES TO REPORT-TYPEC1 (2)
                        GO TO II-3-WRITE-INDEX.
                IF PAGE-INDEX (1) = 'G 1',
                        MOVE 'PROGRAM AVERAGES ' TO REPORT-TYPE-C1 (1)
                        MOVE SPACES TO REPORT-TYPE-C1 (2)
                        GO TO II-3-WRITE-INDEX.
                IF PAGE-INDEX (1) = 'F 3',
                        MOVE 'TIME PERIOD AVERAGE ' TO REPORT-TYPE-C1 (1)
                        MOVE SPACES TO REPORT-TYPE-C1 (2)
                        GO TO II-3-WRITE-INDEX.
                IF PAGE-INDEX (1) ='G 9'
                        MOVE 'PROGRAM AVERAGES ' TO REPORT-TYPE-C1 (1)
                        GO TO II-3-WRITE-INDEX.
                IF PAGE-INDEX (1) = '012',
                        MOVE 'TIME PERIOD AVERAGE ' TO REPORT-TYPE-C1 (1)
                        MOVE SPACES TO REPORT-TYPE-C1 (2)
                        GO TO II-3-WRITE-INDEX.
                MOVE SPACES TO REPORT-TYPE-C1 (1).
                MOVE SPACES TO REPORT-TYPE-C1 (2).
        I-3-WRITE-INDEX.
                MOVE INDEX-LINE TO TEXT-OUT.
                MOVE ' ' TO CCM-CONTROLS.
                PERFORM ZZ-WRITE-REC THRU ZZ-WRITE-REC-EXIT.
                ADD 1 TO SUBS1.
                ADD 1 TO SUBS2.
                GO TO II-2-WRITE-INDEX.
        I-WRITE-INDEX-WARNING.
                PERFORM ZZ-WRITE-REC THRU ZZ-WRITE-REC-EXIT.
                MOVE INDEX-WARNING1 TO TEXT-OUT.
                PERFORM ZZ-WRITE-REC THRU ZZ-WRITE-REC-EXIT.
                MOVE INDEX-WARNING TO TEXT-OUT.
```

```
            PERFORM ZZ-WRITE-REC THRU ZZ-WRITE-REC-EXIT.
            MOVE INDEX-WARNING3 TO TEXT-OUT.
            PERFORM ZZ-WRITE-REC THRU ZZ-WRITE-REC-EXIT.
   II-WRITE-INDEX-EXIT.
            EXIT.
   JJ-WRITE-LABEL.
            MOVE ' B' TO COM-CONTROLS.
            MOVE '14' TO SHIFT-IN.
            PERFORM ZZ-WRITE-REC THRU ZZ-WRITE-REC-EXIT.
            MOVE 'C ' TO COM-CONTROLS.
            MOVE '00' TO SHIFT-IN.
            PERFORM ZZ-WRITE-REC THRU ZZ-WRITE-REC-EXIT.
            MOVE 'L ' TO COM-CONTROLS.
            PERFORM ZZ-WRITE-REC THRU ZZ-WRITE-REC-EXIT.
            MOVE '99' TO COM-CONFTROLS.
            MOVE '-3-B' TO SHIFT-IN.
            MOVE '-N' TO SHIFT-OUT.
            IF USED-FICHE-SWITCH = 1,
                   MOVE UFN TO FL-NBER
                   MOVE USD1 TO FL-SERIES-D1
                   SET SERIES-CODE TO USD2
                   MOVE ALPHA-SERIES (SERIES-CODE) TO FL-SERIES-D2
                   DISPLAY 'RERUN ON ',
                              ABC-MKT-NAME,
                              FL-SERIES-D1,
                              FL-SERIES-D2,
                              '.' ,
                              FL-NBER
            ELSE
                   MOVE FICHE-NUMBER TO FL-NBER
                   MOVE SERIES-D1 TO FL-SERIES-D1
                   SET SERIES-CODE TO SERIE-D2
                   MOVE ALPHA-SERIES (SERIES-CODE) TO FL-SERIES-D2.
            MOVE FICHE-LABEL-NAME TO TEXT-OUT
            PERFORM ZZ-WRITE-REC THRU ZZ-WRITE-REC-EXIT.
            MOVE 'K ' TO COM-CONTROLS
            PERFORM ZZ-WRITE-REC THRU ZZ-WRITE-REC-EXIT.
   JJ-WRITE-LABEL-EXIT.
            EXIT.
   KK-UPDATE-MKT-FILE.
            MOVE LEVEL-OF-INDEX-14 TO LAST-14-LEVEL.
            MOVE SPACES TO FIRST-LEVEL-INDEX.
            MOVE WS-MARKET-INDEX TO ABC-MKT-INDEXES.
            MOVE FICHE-COUNT-NUMBER TO INDX-FICHE (1).
            MOVE ABC-RPT-YEAR TO INDX-YEAR (1).
            MOVE ABC-RPT-MONTH TO INDX-MONTH (1).
   KK-2-UPDATE-MKT-FILE.
            MOVE 'THIS MARKET HAS NOT BEEN UPDATED' TO INV-KEY-TEXT.
            MOVE ABC-MKT-NAME TO INV-KEY-MN.
            MOVE INDEX-LEVELS (1) TO INV-KEY-FL1.
            PERFORM KK-REWRITE-MKT-FILE THRU KK-REWRITE-MKT-EXIT.
            GO TO KK-UPDATE-MKT-FILE-EXIT.
   KK-UPDATE-MKT-FILE-EXIT.
            EXIT.
   KK-REWRITE-MKT-FILE.
            REWRITE ABC-MAR-REC FROM ABC-MARKET-RECORD
                        INVALID KEY DISPLAY INV-KEY-MESSAGE2, MKT-NCM-KEY.
   KK-REWRITE-MKT-EXIT.
            EXIT.
   LL-INIT-INDEX.
            MOVE SPACES TO INDEX-LINE.
            MOVE SPACES TO INDEX-ARRAYS.
            MOVE 1 TO INDEX-SUBS.
   LL-INIT-INDEX-EXIT.
            EXIT.
   MM-PAGE-MATRIX.
            MOVE '77' TO COM-CONTROLS.
            MOVE '-3-B' TO SHIFT-IN.
            MOVE MAT (FRAME-PAGE-COUNT) TO TEXT-OUT.
            MOVE '-N' TO SHIFT-OUT.
            PERFORM ZZ-WRITE-REC THRU ZZ-WRITE-REC-EXIT.
                GO TO MM-PAGE-MATRIX-EXIT.
   MM-PAGE-MATRIX-EXIT.
            EXIT.
   NN-UPDATE-DUMMY.
            MOVE '10000' TO MKT-NCM-KEY
            MOVE 'CONTROL RECORD MISSING' TO INV-KEY-MESSAGE.
            PERFORM 010-READ-MKT-FILE THRU 010-READ-MKT-FILE-EXIT.
            IF INV-KEY-SWITCH = 1,
                        MOVE 0 TO INV-KEY-SWITCH
                        DISPLAY 'FICHE COUNT NUMBER : ', FICHE-COUNT-NUMBER
                        GO TO NN-UPDATE-DUMMY-EXIT.
            MOVE FICHE-COUNT-NUMBER TO INDX-FICHE (1).
            MOVE 'CONTROL RECORD HAS NOT BEEN UPDATED' TO INV-KEY-TEXT
            MOVE SPACES TO INV-KEY-MN.
            MOVE INDEX-LEVELS (1) TO INV-KEY-FL1.
            PERFORM KK-REWRITE-MKT-FILE THRU KK-REWRITE-MKT-EXIT.
            GO TO NN-UPDATE-DUMMY-EXIT.
   NN-UPDATE-DUMMY-EXIT.
            EXIT.
   PP-MASTER-INDEX.
            PERFORM PP-2-MI-TITLE.
            GO TO PP-3-MASTER-INDEX.
```

```
PP-2-MI-TITLE.
    MOVE 1 TO LINE-COUNT.
    MOVE MASTER-INDEX-TITLE TO TEXT-OUT.
    MOVE '0 ' TO COM-CONTROLS.
    PERFORM ZZ-WRITE-REC THRU ZZ-WRITE-REC-EXIT.
    MOVE MI-SUB-TITLE TO TEXT-OUT.
    MOVE '- ' TO COM-CONTROLS.
    PERFORM ZZ-WRITE-REC THRU ZZ-WRITE-REC-EXIT.
    MOVE '  ' TO COM-CONTROLS.
    PERFORM ZZ-WRITE-REC THRU ZZ-WRITE-REC-EXIT.
    ADD 6 TO LINE-COUNT.
PP-3-MASTER-INDEX.
    READ MKT-SORTED, AT END GO TO PP-9-EOF-MI.
    IF LINE-COUNT > 40,
        PERFORM MM-PAGE-MATRIX THRU MM-PAGE-MATRIX-EXIT
        MOVE 'A ' TO COM-CONTROLS
        PERFORM ZZ-WRITE-REC THRU ZZ-WRITE-REC-EXIT
        ADD 1 TO FRAME-PAGE-COUNT
        PERFORM PP-2-MI-TITLE.
    MOVE SORTED-RECORD TO ABC-MARKET-RECORD
    MOVE SPACES TO MI-REFERENCE.
    MOVE ABC-MKT-NAME TO MI-MKT-NME.
    MOVE 1 TO SUBS3.
    MOVE 1 TO SUBS4.
PP-4-MASTER-INDEX.
    IF SUBS3 > 15,
        MOVE MI-REFERENCE TO TEXT-OUT
        MOVE '0 ' TO COM-CONTROLS
        PERFORM ZZ-WRITE-REC THRU ZZ-WRITE-REC-EXIT
        ADD 1 TO LINE-COUNT
        GO TO PP-3-MASTER-INDEX.
    IF INDX-MONTH (SUBS3) = SPACES
        MOVE MI-REFERENCE TO TEXT-OUT
        MOVE '0 ' TO COM-CONTROLS
        PERFORM ZZ-WRITE-REC THRU ZZ-WRITE-REC-EXIT
        ADD 1 TO LINE-COUNT
        GO TO PP-3-MASTER-INDEX.
    IF SUBS4 > 6,
        MOVE MI-REFERENCE TO TEXT-OUT
        MOVE '0 ' TO COM-CONTROLS
        PERFORM ZZ-WRITE-REC THRU ZZ-WRITE-REC-EXIT
        ADD 1 TO LINE-COUNT
        MOVE 1 TO SUBS4
        MOVE SPACES TO MI-REFERENCE.
    MOVE INDX-YEAR (SUBS3) TO MI-YR (SUBS4).
    MOVE INDX-MONTH (SUBS3) TO MI-MM (SUBS4).
    MOVE '-' TO MI-CASH2 (SUBS4).
    MOVE '-' TO MI-CASH (SUBS4).
    MOVE INDX-FICHE (SUBS3) TO FICHE-COUNT-NUMBER.
    MOVE FICHE-NUMBER TO MI-NBER (SUBS4).
    MOVE SERIE-D1 TO MI-SER1 (SUBS4).
    SET SERIES-CODE TO SERIE-D2.
    MOVE ALPHA-SERIES (SERIES-CODE) TO MI-SER2 (SUBS4).
    ADD 1 TO SUBS4.
    ADD 1 TO SUBS3,
    GO TO PP-4-MASTER-INDEX.
PP-9-EOF-MI.
    PERFORM MM-PAGE-MATRIX THRU MM-PAGE-MATRIX-EXIT.
PP-MASTER-INDEX-EXIT.
    EXIT.
SS-NEXT FRAME.
    MOVE 'F' TO COM-CONTROLS.
    PERFORM ZZ-WRITE-REC THRU ZZ-WRITE-REC-EXIT.
    AND 1 TO FRAME-PAGE-COUNT.
SS-NEXT-FRAME-EXIT.
    EXIT.
TT-INDEX-FRAME.
    IF FRAME-PAGE-COUNT > 96
        GO TO TT-16L-INDEX.
TT-8L-INDEX.
    MOVE 96 TO FRAME-PAGE-COUNT.
    MOVE ' B' TO COM-CONTROLS
    MOVE '00' TO SHIFT-IN.
    PERFORM ZZ-WRITE-REC THRU ZZ-WRITE-REC-EXIT.
    MOVE ' C' TO COM-CONTROLS.
    MOVE '7' TO SHIFT-IN.
    PERFORM ZZ-WRITE-REC THRU ZZ-WRITE-REC-EXIT.
    GO TO TT-INDEX-FRAME-EXIT.
TT-16L-INDEX.
    MOVE 193 TO FRAME-PAGE-COUNT.
    MOVE ' B' TO COM-CONTROLS.
    MOVE '00' TO SHIFT-IN.
    PERFORM ZZ-WRITE-REC THRU ZZ-WRITE-REC-EXIT.
    MOVE ' C' TO COM-CONTROLS.
    MOVE '17' TO SHIFT-IN.
    PERFORM ZZ-WRITE-REC THRU ZZ-WRITE-REC-EXIT.
TT-INDEX-FRAME-EXIT.
    EXIT.
UU-SUBHEADINGS.
    IF ABC-RPT-TYPE = 8,
        MOVE '- ' TO COM-CONTROLS
        PERFORM ZZ-WRITE-REC THRU ZZ-WRITE-REC-EXIT
            ADD 3 TO LINE-COUNT
```

```
                PERFORM H-SUBHEAD-TP-DAY THRU H-SUBHEAD-TP-DAY-EXIT
                PERFORM H-SUBHEAD-TP-TIME THRU H-SUBHEAD-TP-TIME-EXIT
                GO TO UU-SUBHEADINGS-EXIT.
        IF ABC-RPT-TYPE = 7,
        MOVE '- ' TO COM-CONTROLS
                PERFORM ZZ-WRITE-REC THRU ZZ-WRITE-REC-EXIT
                ADD 3 TO LINE-COUNT
                PERFORM I-SUBHEAD-PA-TIME THRU I-SUBHEAD-PA-TIME-EXIT
                ADD 3 TO LINE-COUNT
                PERFORM I-SUBHEAD-PA-TIME THRU I-SUBHEAD-PA-TIME-EXIT
                GO TO UU-SUBHEADINGS-EXIT.
        IF ABC-RPT-TYPE = 5,
                PERFORM ZZ-WRITE-REC THRU ZZ-WRITE-REC-EXIT
                ADD 1 TO LINE-COUNT.
        PERFORM J-SUBHEAD-DP-DAY THRU J-SUBHEAD-DP-DAY-EXIT
        PERFORM J-SUBHEAD-DP-DAYPART THRU J-SUBHEAD-DP-DAYPART-EXIT.
UU-SUBHEADINGS-EXIT.
        EXIT.
XX-CHECK-RERUN.
        MOVE 1 TO SUBS5.
XX-2-CHECK-RERUN.
        IF SUBS5 > 15,
                    MOVE 0 TO USED-FICHE-SWITCH
                    GO TO XX-CHECK-RERUN-EXIT.
        IF INDX-MONTH (SUBS5) = SPACES,
                    MOVE 0 TO USED-FICHE-SWITCH
                    GO TO XX-CHECK-RERUN-EXIT.
        IF INDX-MONTH (SUBS5) = PREV-RPT-MONTH AND
        INDX-YEAR (SUBS5) = PREV-RPT-YEAR,
                    MOVE 1 TO USED-FICHE-SWITCH
                    MOVE INDX-FICHE (SUBS5) TO USED-FICHE-COUNT-NUMBER
                    GO TO XX-CHECK-RERUN-EXIT.
        ADD 1 TO SUBS5
        GO TO XX-2-CHECK-RERUN.
XX-CHECK-RERUN-EXIT.
EXIT.
YY-SKIP-MARKET.
        MOVE ABC-MRKT-CODE TO PREV-MARKET-CODE.
YY-2-SKIP-MARKET.
        READ ABC-FILE INTO ABC-COMMON-RECORD
                    AT END GO TO 235-EOF-ABC-RTN.
        IF ABC-MRKT-CODE = PREV-MARKET-CODE
                    GO TO YY-SKIP-MARKET.
        IF ABC-RECORD-TYPE = 'T',
                    MOVE ABC-COMMON-RECORD TO WS-TOTAL-RECORD-STORED
                    GO TO YY-2-SKIP-MARKET.
YY-SKIP-MARKET-EXIT.
        EXIT.
ZZ-WRITE-REC.
        IF SHIFT-IN = SPACES,
                    MOVE 'N' TC SHIFT-IN.
        WRITE COM-RECORD FROM DETAIL-LINE.
        MOVE SPACES TO DETAIL-LINE.
ZZ-WRITE-REC-EXIT.
        EXIT.
M-4B-FORMAT-REC.
        IF ABC-ARB-CALL-LETR NCT = PREV-TP-STATION,
                MOVE ABC-ARB-CALL-LETR TO TP-DL-STATION.
            GO TO M-4C-FORMAT-REC.
M-4C-FORMAT-REC.
        IF ABC-RATING-COMP = 'A'
                GO TO M-4D-FORMAT-REC.
        IF ABC-NSI-TP-STAT-CALL = ABC-MKT-STATION-1
                            OR ABC-MKT-STATION-2
            MOVE 1 TO BOLD-SWITCH.
        GO TO M-10-FORMAT-REC.
M-4D-FORMAT-REC.
        IF ABC-ARP-CALL-LETR = ABC-MKT-STATION-1
                            CR ABC-MKT-STATION-2
            MOVE 1 TO BOLD-SWITCH.
        GO TO M-10-FORMAT-REC.
M-5-FORMAT-REC.
        IF ABC-RPT-TYPE NOT = 7,
                    GO TO M-7-FORMAT-REC.
        IF STATION-SWITCH = 1 AND ABC-RATING-COMP = 'A'
                    MOVE ABC-ARB-CALL-LETR TO PA-DL-STATION.
        IF STATION-SWITCH = 1 AND ABC-RATING-COMP = 'N'
                    MOVE ABC-NSI-PP-CALL-LETR TO PA-DL-STATION.
        IF ABC-RATING-COMP = 'A',
                    GO TO M-5A-FORMAT-REC.
        IF ABC-NSI-PP-CALL-LETR = ABC-MKT-STATION-1
                    OR ABC-MKT-STATION-2
                MOVE 1 TO BOLD-SWITCH.
        GO TO M-5B-FORMAT-REC.
M-5A-FORMAT-REC.
        IF ABC-ARB-CALL-LETR = ABC-MKT-STATION-1,
                        OR ABC-MKT-STATION-2,
                MOVE 1 TO BOLD-SWITCH.
        GO TO M-5B-FORMAT-REC.
M-5B-FORMAT-REC.
        MOVE 0 TO STATION-SWITCH.
        IF ABC-RATING-COMP = 'A',
                MOVE ABC-ARB-PP-PGM TO PA-DL-PROGRAM
```

```
        ELSE
                MOVE ABC-NSI-PP-PGM TO PA-DL-PROGRAM.
        IF ABC-RATING-COMP = 'N'
                GO TO M-6-FORMAT-REC.
        MOVE ABC-ARE-DAY-CODE TO AADC.
        IF AADC NOT = 9, ADD 1 TO AADC.
        SET DAY-ARE-PA-CODE TO AADC.
        MOVE DAY-ARB (DAY-ARB-PA-CODE) TO PA-DL-DAY
        GO TO M-10-FORMAT-REC.
M-6-FORMAT-REC.
        SET DAY-NSI-PA-CODE TO ABC-NSI-PP-DAY-CODE
        MOVE DAY-NSI-N8 (DAY-NSI-PA-CODE) TO PA-DL-DAY.
        GO TO M-10-FORMAT-REC.
M-7-FORMAT-REC.
        IF ABC-RPT-TYPE NOT = 6,
                GO TO M-8-FORMAT-REC.
        MOVE ABC-NETWORK-CODE TO NA-DL-NETWORK-CODE
        IF NA-DL-NETWORK-CODE = 'ABC'
                MOVE 1 TO BOLD-SWITCH.
        GO TO M-10-FORMAT-REC.
M-8-FORMAT-REC.
        IF ABC-RATING-COMP = 'A'
                GO TO M-8B-FORMAT-REC.
        MOVE ABC-NSI-DP-CALL-LETR TO DP-CL-CALL-LETTER.
        IF ABC-NSI-DP-CALL-LETR = ABC-MKT-STATION-1 OR
                ABC-MKT-STATION-2
                MOVE 1 TO BOLD-SWITCH.
        MOVE ABC-NSI-DP-CHANNEL TO DP-DL-STATION.
        MOVE ABC-NSI-DP-NETWORK TO DP-DL-NETWORK-CODE.
        GO TO M-10-FORMAT-REC.
M-8E-FORMAT-REC.
        MOVE ABC-ARB-CALL-LETR TO DP-DL-CALL-LETTER
        IF ABC-ARB-CALL-LETR = ABC-MKT-STATION-1 OR ABC-MKT-STATION-2,
                MOVE 1 TO BOLD-SWITCH.
        GO TO M-10-FORMAT-REC.
M-10-FORMAT-REC.
        MOVE ' ' TO COM-CONTROLS
        IF BOLD-SWITCH = 1
                MOVE '-I' TO SHIFT-IN
                MOVE '-N' TO SHIFT-OUT
                MOVE 0 TO BOLD-SWITCH.
        PERFORM ZZ-WRITE-REC THRU ZZ-WRITE-REC-EXIT.
        ADD 1 TO LINE-COUNT.
M-FORMAT-REC-EXIT.
        EXIT.
235-SORTING SECTION.
SORTING-1.
        OPEN INPUT MKT-SFILE.
SORTING-2.
        READ MKT-SFILE, AT END GO TO SORTING-3.
        IF MKT-KEY2 = '1000' GO TO SORTING-2.
        IF MKT-KEY2-REC-10 = '2', GO TO SORTING-3.
        MOVE ABC-MKT-RECORD-IN TO RECORD-TO-SORT.
        RELEASE RECORD-TO-SORT.
        GO TO SORTING-2.
SORTING-3.
        CLOSE MKT-SFILE.
SORTING-EXIT.
        EXIT.
```

The above description of the invention is intended to be illustrative and not limiting. Various changes or modifications in the embodiments described may occur to those skilled in the art and these can be made without departing from the spirit or scope of the invention. For example, the invention can be used with various different types of data, not just broadcast data. Furthermore, the invention can be used with radio broadcast data as well as television broadcast data:

I claim:

1. A system for storing and retrieving market research information, said information including reports from a plurality of different sources, said system comprising a plurality of photographic record members, each bearing, in reduced size, the information for an integral number of basic market categories, each of said record members bearing corresponding reports from each source for the same market category, the information forming each report being separated into a plurality of segments, each segment being recorded at the same position on each record member, selecting means for selecting one of said record members in accordance with a predetermined code identifying a selected basic market category, said selecting means including a keyboard with a plurality of keys, means for communicating between said keyboard and said selecting means for selecting the record member and the position of the data on said record member to be displayed in accordance with a code, the code for data at any given position of one of said reports having a predetermined relationship to the code for data at a corresponding position of each other of said reports, in order to facilitate switching back and forth between different reports rapidly, the keys on said keyboard being arranged so that a key for one data item in one report is located immediately adjacent to the corresponding key for the corresponding data item on another report so as to facilitate the display of corresponding data from each of the reports, said selecting means including means for changing the illuminated image from one to another corresponding report.

2. A system for storing and retrieving broadcast market research information, said system comprising, in combination, a plurality of microfiche members, each bearing, in reduced size, the information for an integral number of broadcast markets, the information for each market being located within a basic data zone, said information being divided into data divisions, each division being located at the same place in each basic data zone, fiche selection means for selecting one of said microfiche in accordance with a code representing a plurality of broadcast markets, the data on each microfiche comprising a plurality of pages of graphic matter, projection and enlargement means, page selection means for positioning a page on the selected fiche and said projection and enlargement means relative to one another so as to display an enlarged image of the page in response to a code representing said data divisions, each fiche bearing a plurality of market survey reports, each occupying one of said basic data zones, said page selection means including a key array for entering page selection codes, the codes for pages in each of said reports bearing a fixed relationship to the codes for pages at corresponding locations in each other report on said fiche, the keys to be operated to encode corresponding pages from the multiple reports on a given fiche being located closely adjacent one another so as to facilitate rapid viewing of corresponding pages from different reports.

3. A system as in claim 2 in which each page identification code includes at least two digits; a prefix and a suffix, and the prefix is the same for corresponding pages on the multiple reports, whereby rapid switching between corresponding pages is further facilitated.

4. A system as in claim 3 in which each suffix is represented by a single key, the keys representing suffixes being located in separate parallel linear arrays, with the keys in each linear array representing one report with corresponding keys in the linear arrays being located opposite one another.

* * * * *